US012750434B2

(12) United States Patent
Byadgi et al.

(10) Patent No.: US 12,750,434 B2
(45) Date of Patent: Sep. 29, 2026

(54) METHODS AND DEVICES FOR MANAGING COMMUNICATION OF ARTIFICIAL INTELLIGENCE DATA BETWEEN DEVICES

(71) Applicant: SAMSUNG ELECTRONICS CO., LTD., Suwon-si (KR)

(72) Inventors: Chandrashekhar S Byadgi, Bengaluru (IN); Kartik Anand, Bengaluru (IN); Praveen Naik S, Bengaluru (IN); Ashish Kumar, Bengaluru (IN); Srinidhi N, Bengaluru (IN); Ramesh Babu Venkat Dabbiru, Bengaluru (IN); Jyotirmoy Karjee, Bengaluru (IN); Siva Prasad Gundur, Bengaluru (IN); Eric Ho Ching Yip, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 118 days.

(21) Appl. No.: 18/752,402

(22) Filed: Jun. 24, 2024

(65) Prior Publication Data

US 2024/0348703 A1 Oct. 17, 2024

Related U.S. Application Data

(63) Continuation of application No. PCT/KR2024/000242, filed on Jan. 5, 2024.

(30) Foreign Application Priority Data

Jan. 12, 2023 (IN) ............................. 202341002496
Dec. 20, 2023 (IN) ............................. 202341002496

(51) Int. Cl.
*G06F 15/16* (2006.01)
*H04L 69/04* (2022.01)

(52) U.S. Cl.
CPC .................................... *H04L 69/04* (2013.01)

(58) Field of Classification Search
CPC ................................ H04L 69/04; G06N 20/00
See application file for complete search history.

(56) References Cited

U.S. PATENT DOCUMENTS 12,265,888 B1 * 4/2025 Meyer .................... G06N 20/00
2016/0241878 A1 8/2016 Aaron et al.
(Continued)

FOREIGN PATENT DOCUMENTS

CN 113139095 A 7/2021
KR 10-2022-0052756 4/2022
(Continued)

OTHER PUBLICATIONS

Extended European Search Report dated Apr. 7, 2025 issued in European Patent Application No. 24741637.3.
(Continued)

*Primary Examiner* — Duyen M Doan
(74) *Attorney, Agent, or Firm* — Nixon & Vanderhye, P.C.

(57) ABSTRACT

The present disclosure relates to methods and devices for managing communication of Artificial Intelligence (AI) data between devices in a computing environment. Detecting one or more sets of changes in data values associated with current data frame based on comparison between current data frame and previously generated data frame. Further, performing generation of one or more data chunks of an updated data frame, comprising one or more data segments based on the one or more sets of changes, based on one of, a first codec technique and second codec technique. Transmitting one or more data chunks to one or more receiver devices based on the respective data chunk satisfying a specified chunk size. Transmitting the one or more data
(Continued)

chunks generated for updated data frame to one or more receiver devices based on respective data chunk satisfying a specified chunk size.

20 Claims, 17 Drawing Sheets

(56) References Cited

U.S. PATENT DOCUMENTS

| | | | | |
|---|---|---|---|---|
| 2017/0013040 | A1 | 1/2017 | Ponekker et al. | |
| 2018/0268290 | A1 | 9/2018 | Vega et al. | |
| 2018/0322386 | A1 | 11/2018 | Sridharan et al. | |
| 2019/0197404 | A1 | 6/2019 | Gao et al. | |
| 2019/0236173 | A1 | 8/2019 | Ghatage et al. | |
| 2020/0293887 | A1 | 9/2020 | De Brouwer et al. | |
| 2021/0264567 | A1* | 8/2021 | Kim | G06N 3/0464 |
| 2022/0156368 | A1* | 5/2022 | Spyridopoulos | G06N 3/09 |
| 2022/0224744 | A1 | 7/2022 | Beattie, Jr. et al. | |
| 2023/0214713 | A1* | 7/2023 | Choi | G06N 20/00 706/10 |
| 2025/0031230 | A1* | 1/2025 | Chen | G06N 20/00 |

FOREIGN PATENT DOCUMENTS

| | | | |
|---|---|---|---|
| KR | 10-2022-0081648 | | 6/2022 |
| WO | 2021062427 | A1 | 4/2021 |
| WO | 2022/066368 | A1 | 3/2022 |

OTHER PUBLICATIONS

International Search Report for PCT/KR2024/000242 dated Apr. 9, 2024, 3 pages.
Written Opinion of the ISA for PCT/KR2024/000242 dated Apr. 9, 2024, 4 pages.
Indian Examination Report dated Jul. 16, 2026 for IN Application No. 202340112496.

* cited by examiner

METHODS AND DEVICES FOR MANAGING COMMUNICATION OF ARTIFICIAL INTELLIGENCE DATA BETWEEN DEVICES

CROSS-REFERENCE TO RELATED APPLICATIONS

This application is a continuation of International Application No. PCT/KR2024/000242 designating the United States, filed on Jan. 5, 2024, in the Korean Intellectual Property Receiving Office and claiming priority to Indian Provisional Patent Application No. 202341002496, filed on Jan. 12, 2023, and to Indian Complete patent application No. 202341002496, filed on Dec. 20, 2023, in the Indian Patent Office, the disclosures of each of which are incorporated by reference herein in their entireties.

BACKGROUND

Field

The disclosure relates to data communication between devices. For example, the disclosure relates methods and devices for managing communication of Artificial Intelligence (AI) data between devices in a distributed computing environment.

Description of the Related Art

Computing environments serve as an infrastructure to technologies and software platforms that are used to develop, test, deploy, and run applications. With distributed computing, federated learning, and other Artificial Intelligence (AI) communication technologies are growing day by day and streaming of AI data between devices is becoming common. The AI data may comprise of streaming information such as, audios and videos which are associated with various AI applications running on a device. In some instances, the AI applications may require streaming of the AI data between one or more devices and may be associated with complex processing. Technologies including, but not limited to, split computing, federated learning, split federated learning, Multi-Agent-System (MAS) AI environment, Swarm Intelligence (SI) environments, and the like are highly reliant on communicating the AI data between the devices. In order to perform complex tasks with high accuracy, numerous neural network models comprise of numerous model parameters.

Thus, as a result, size of models associated with the AI applications is high and also leads to generation of bulk intermediate data for each layer. This further results in a huge growth of the models which leads to an increasing growth in size of the AI data associated with each layer in the model. The communication of large amount of the AI data between devices defeats the purpose of low-latency communication. Due to bulkiness of the neural network models, the devices are bandwidth and power-hungry. Techniques that maintain an accuracy of the neural network models and communicate minimum AI data between devices are the need of the hour for low latency distributed applications. Therefore, the applications which are associated with AI data streaming are battery-operated due to which a lot of power is consumed, causing bad user experience.

Further, AI communication technologies include, but are not limited to, split computing, federated learning, split federated learning, and the like. In split computing, it is observed that intermediate outputs generated for consecutive frames are quite similar in case of applications associated with computer vision such as, object recognition, pose estimation, and the like. This is because of similarities between consecutive frames generated for the corresponding applications. Communicating similar data redundantly between devices can be largely avoided using an AI codec. Further, in federated learning, when the model updates are being transferred between devices, for instance, from multiple local devices to federated server and vice versa, a lot of redundant data (model weights & biases) are communicated between devices. In split federated learning as well, forward propagation data and back propagation data are transferred between devices for every batch of training data which also carries a lot of redundant data between clients and split federated servers. FIG. 1 illustrates an existing technique of AI data transmission in existing systems. As seen from FIG. 1, very few changes are present between two intermediate data frames due to the similarities in the successive frames, for streaming applications. As a sender device 101 generates multiple frames per second, similar data must be avoided between the end points.

The information disclosed in this background is simply for enhancement of understanding of general background and should not be taken as an acknowledgement or any form of suggestion that this information forms the prior art already known to a person skilled in the art.

SUMMARY

According to an example embodiment, the present disclosure discloses a method of managing communication of Artificial Intelligence (AI) data between devices in a computing environment. The method comprises detecting one or more sets of changes in data values associated with a current data frame generated by the sender device for an AI application associated with the sender device. The detection is performed based on a comparison between the current data frame and a previously generated data frame. The method comprises simultaneously performing operations for the sender device. The operations include generating one or more data chunks, for an updated data frame, comprising one or more data segments based on the one or more sets of changes, for the current data frame. The one or more data chunks are generated based on one of, a first codec technique and a second codec technique. The operations include transmitting the one or more data chunks generated for the updated data frame to one or more receiver devices based on the respective data chunk satisfying a specified chunk size.

According to an example embodiment, the present disclosure discloses a method of managing communication of Artificial Intelligence (AI) data between devices in a computing environment. The method comprises simultaneously performing operations at a receiver device. The operations comprise receiving one or more data chunks of an updated data frame for an AI application, comprising one or more data segments associated with one or more sets of changes in data values relative to a previously decoded data frame of the AI application, from one or more sender devices. Each of the one or more data segments are received as encoded data segments being encoded based on one of, a first codec technique and a second codec technique. The operations comprise generating a decoded data chunk for each of the one or more data chunks by decoding each of the one or more data segments corresponding to the respective data chunks. The generation is performed based on one of, the first codec technique and the second codec technique.

According to an example embodiment, the present disclosure discloses a sender device for managing communication of Artificial Intelligence (AI) data between devices in a computing environment. The sender device comprises at least one processor comprising processing circuitry and a memory communicatively coupled to the processor, where the memory stores processor executable instructions, wherein at least one processor, individually and/or collectively, may be configured to cause the sender device to detect one or more sets of changes in data values associated with a current data frame generated by the sender device for an AI application associated with the sender device. The detection is performed based on a comparison between the current data frame and a previously generated data frame. The sender device is configured to perform the further steps simultaneously. The sender device is configured to perform further steps of generating one or more data chunks, for an updated data frame, comprising one or more data segments based on the one or more sets of changes, for the current data frame. The one or more data chunks are generated based on one of, a first codec technique and a second codec technique. The sender device is configured to transmit the one or more data chunks generated for the updated data frame to one or more receiver devices based on the respective data chunk satisfying a specified chunk size.

According to an example embodiment, the present disclosure discloses a receiver device for managing communication of Artificial Intelligence (AI) data between devices in a computing environment. The receiver device comprises at least one processor comprising processing circuitry and a memory communicatively coupled to the processor, wherein at least one processor, individually and/or collectively may be configured to cause the receiver device to simultaneously perform receiving one or more data chunks of an updated data frame for an AI application, comprising one or more data segments associated with one or more sets of changes in data values relative to a previously decoded data frame of the AI application, from one or more sender devices. Each of the one or more data segments are received as encoded data segments being encoded based on one of, a first codec technique and a second codec technique. The receiver device is configured to generate a decoded data chunk for each of the one or more data chunks by decoding each of the one or more data segments corresponding to the respective data chunks. The generation is performed based on one of, the first codec technique and the second codec technique.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The above and other aspects, features and advantages of certain embodiments of the present disclosure will be more apparent from the following detailed description, taken in conjunction with the accompanying drawings, in which.

Figure 1:
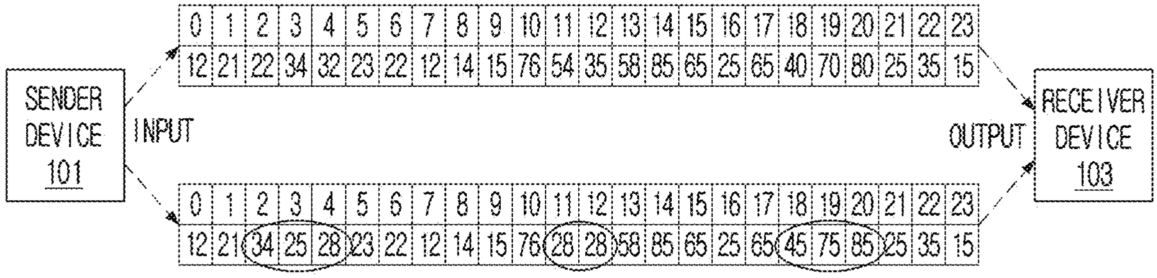
FIG. 1 (RELATED ART)
FIG. 1 is a diagram illustrating an existing technique of AI data transmission.

It should be appreciated by those skilled in the art that any block diagram herein represents conceptual views of illustrative systems embodying various example principles of the present disclosure. Similarly, it will be appreciated that any flowcharts, flow diagrams, state transition diagrams, pseudo code, and the like represent various example processes which may be substantially represented in computer readable medium and executed by a computer or processor, whether or not such computer or processor is explicitly shown.

DETAILED DESCRIPTION

In the present disclosure, the word "exemplary" is used herein to refer, for example, to "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, various example embodiments thereof have been shown by way of example in the drawings and will be described in greater detail below. It should be understood, however that it is not intended to limit the disclosure to the particular forms disclosed, but on the contrary, the disclosure is intended to cover all modifications, equivalents, and alternatives falling within the scope of the disclosure.

The terms "comprises", "comprising", or any other variations thereof, are intended to cover a non-exclusive inclusion, such that a setup, device, or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or apparatus.

AI communication technologies are associated with generation of data frames for streaming AI data for an AI application between devices. Currently, for achieving high accuracy during a streaming process, numerous neural network models are used. Therefore, as a result, size of models associated with the AI applications is increasing and further leading to generation of bulky and redundant data for each layer. This in turn results in a huge growth of the models which leads to an increasing growth in size of the AI data associated with each layer in the model. Thus, communicating large amount of the AI data between devices defeats the purpose of maintaining a low-latency communication. Due to bulkiness of the neural network models, the devices are bandwidth and power-hungry.

The present disclosure provides methods and devices for managing communication of Artificial Intelligence (AI) data between devices in a computing environment. The present disclosure provides a first codec technique and a second codec technique which enable reduction of AI data Hence, the present disclosure facilitates in improving the speed of the process of data transmission while maintaining an optimal latency and further reducing power consumption.

The present disclosure relates to data communication between two or more devices within a network. For example, but not exclusively, the present disclosure relates to a method and system for providing a tensor data protocol for Artificial Intelligence (AI) data communication.

In recent times, distributed computing is gaining vast attention from researchers and developers where computation can be done on multiple devices. One such field is split computing. In a split computing environment, machine learning model execution is distributed among two or more computationally capable devices. In a typical scenario, some part of the execution happens on one device and the rest on another device.

Partially executed data is transferred from one device to the other device over a network. But the receiving device needs to know many things/parameters about the tensor data. For example, the receiving device needs to know: data type of tensor data, output format supported by client, how many layers are to be executed in first device, what is model executed, tensor framework used, required processors used at client side for partial inference (CPU, GPU, NPU, TPU), sequence number of inference data, kind of data (such as partial inference data, full inference data, back propagation, weights propagation etc.), the byte containing a difference inference data or full inference data, a tensor stream id, dimension of the tensor data, size of partial inference data, sending the demultiplexed data over multiple channels and receiving multiplexed tensor data over multiple channels, and the transport protocol selected by user to send tensor data. Conventionally, there is no mechanism by which the receiving device can determine/know some or all of the above-mentioned parameters.

To address the above problems, systems and methods are disclosed that include an application protocol for the tensor data, which contains information about all of the above-mentioned parameters (tensor data headers). A sending device may pass this information over the network to the receiving devices. At the receiver end, a receiving device may read the protocol information (tensor data headers) and creates an appropriate execution environment to calculate the full inference such as loads/executes/train the appropriate model etc.

Tensor data receiving device can get the tensor execution parameters of the sending device and setup the same environment. In split computing, when a device streams partial inference data to another device or receives full inference from other devices, this intermediate data stream is usually bulky in size which increases network traffic and increases communication latency.

Further, in the present disclosure, systems and methods are disclosed that instead of sending full data, stream difference of the newly generated data compared to previous intermediate date which is lesser in size and serves the purpose. This can be extended to any kind of inference data may it be partial or full inference data or weight transfer that happens during federated learning. Also, tile based partial inference approach helps in additional time savings.

In an embodiment, the present disclosure relates to a universal tensor data protocol, which can be used to transfer any AI/ML data systematically and efficiently between two or more device. According to the present disclosure, the disclosed tensor data protocol is universal tensor data protocol, which can be used to transfer any AI/ML data systematically and efficiently between two or more devices. The partial output (partial inference) data size is reduced by sending the difference between previously sent partial output and newly generated partial output data. Using this approach, sending the entire chunk of partial inference data is avoided and modified/difference part of the partial inference data is sent to save latency and reduce network traffic. This mechanism can be applied to any kind of streaming inference data e.g., partial inference data and full inference data.

It has been observed that data transfer can be reduced by approximately 50% compared to sending the full partial inference data. This savings may depend on the model used, for some models the gain of sending data to other device could even be more than 50%. The disclosed tensor protocol can be extended to support the chunks to be sent parallelly like divide the tensor data into tiles and tag the tile number and send them in separate channel using tensor data protocol, at the receiving side using the tide numbers tensor protocol receives the inference data and constructs a partial inference.

In an embodiment, the tensor headers block in the tensor data protocol specifies various tensor header values like tensor content type and tensor dimension, and other headers as explained in greater detail below. A tensor data processor block receives tensor data from applications and sends to transport protocol. This block also receives tensor data from transport protocols and deliver to applications. Further, the block tensor data processor manages tensor headers and data from the tensor headers block and the tensor data cache. A tensor data cache block is used to store previous inference data. Using a new inference and previous inference, the disclosure constructs TLV/TVF array at sender side. Using TLV/TVF array and old inference data, the disclosure constructs a new inference at receiver side. A tensor data payload block is a tensor data such as partial inference, full inference, back propagation data etc.

In an embodiment, tensor data receiving device can get the tensor execution parameters of the sending device and setup the same environment. In split computing, when a device streams partial inference data to another device or receives full inference from other devices, this intermediate data stream is usually bulky in size which increases network traffic and increases communication latency. Instead of sending full data as it is, the present disclosure discloses to stream difference of newly generated data compared to previous intermediate date which is lesser in size and serves the purpose. This can be extended to any kind of inference data may it be partial or full inference data or weight transfer that happens during federated learning. Tile based partial inference approach helps in additional time savings.

1) Tensor data Headers-1st byte: In an embodiment, a 1st byte is included in the tensor data headers. The 1st byte may include fields such as content type, output content, dimension, etc. The content type tells the tensor data present in protocol is of what type. In case of split computing, data content could be "partial inference". In AI use cases, model file may be shared between devices, in this case data content could be "Model file data". In case of federated learning, data content could be "weights" of a local model sent to update the global model. This can be initiated from the cloud to update the global trained model's "weights" to local model. In case of split federated learning, data content could be "back propagation" model to adjust the weights of local model. Any kind of tensor content can be specified using "tensor-content header. The output content: fields indicate final inference data type it can receive from the device-2. Dimensions specify dimension of a tensor data, so that receiving side can convert the data to appropriate dimension. Data Type field indicates data present in the protocol is partial inference data or difference in partial inference data.

2) Tensor data Headers-2, 3, 4 bytes: In an embodiment, a 2nd byte is included in the tensor data headers. The 2nd byte has fields such as Tensor Stream ID and Tensor Framework. The Tensor stream ID may comprise multiple tensor streams in a single device and single application, unique stream id helps to route data to a tensor data instance or correct app. The Tensor framework indicates tensor framework used by the client to execute the partial CNN layers. This helps the server to execute the partial inference data in the same tensor framework. For instance, 0000 may indicate Tensorflow, 0001 may indicate Keras, 0010 may indicate Pytorch, and like.

In an embodiment, 3rd and 4th byte is included in the tensor data headers. The 3rd and 4th bytes have the sequence number. The sequence number of a partial inference stream is incremented every time a partial inference is sent with a particular tensor ID.

3) Tensor data Headers-5th, 6th bytes: In an embodiment, a 5th byte is included in the tensor data headers. The 5th byte has fields such as Tensor model layers and Tensor model. The Tensor model layers tell how many layers run on device and Tensor model tells which model specific this data is.

In an embodiment, the 6th byte is included in the tensor data headers. The 6th byte has fields such as Transport protocol, Data type and Tiling. The transport protocol is selected by user/app developer to send tensor data. For example, 0000: TCP, 0001: TLS, 0010: UDP, 0011: D-TLS, indicates the transport protocol that may be selected. Data type includes differential data and full data. For example, data type 00 represents differential data, and data type 01 represents full data. Tiling specify how many tiles are used to send tensor data. For example, 00 indicates Single tile used to send tensor (default), 01 indicates 2 tiles used to send tensor data; and 10 indicates 3 tiles used to send tensor data.

4) Tensor data Headers-7, 8, 9 bytes: In an embodiment, a 7th byte is included in the tensor data headers. The 7th byte is reserved for future. The 7th byte has information like lossless compression techniques used to send data, padding present or not, extra headers etc.

In an embodiment, 8th, 9th, and 10th bytes are included in the tensor data headers. The 8th, 9th and 10th bytes comprise information about the length of the tensor data.

It may be noted in the present disclosure that the header bytes reserved for tensor data protocol are just for reference only and in general the header bytes or the headers size may vary.

Tensor data protocol in example split computing environment:

Consider two entities in split computing environment as Device-1 and Device-2. Device-1 is performing partial execution of a DNN model and transfers the intermediate partial output to another device (Device-2) for further execution. Device-1 chooses tensor data protocol and sends all the tensor execution environment (tensor data type, tensor dimension, tensor processors, inference type etc.) along with the tensor data. Device-2 reads the tensor data using tensor data protocol and identify tensor execution environments (tensor data type, tensor dimension, tensor processors, inference type etc.) and chooses the appropriate model to train/load/test data. Further Device-2 passes the received partial inference as an input to the model.

In an embodiment, partial inference data transfer takes place over network to AI service modules present in cloud/Edge. The partial output (partial inference) data size is reduced only by sending the difference between previously sent partial output and newly generated partial output data. Using this approach, sending the entire chunk of partial inference data is avoided and the modified/difference part of the partial inference data is sent to save latency and reduce network traffic.

In an embodiment, tensor protocol data is transferred to the receiving device. The tensor protocol data comprises tensor header bytes and tensor data bytes.

In an embodiment, the tensor protocol data is received at the receiving side. Device-2 receives data such as tensor data, processor type, layers executed, model type, inference type and other data. An appropriate model is chosen. The received the tensor protocol data comprises tensor header bytes and tensor data bytes.

In various embodiments this mechanism may be applied to any kind of streaming inference data. For example, partial inference and full inference data. It has been observed that data transfer can be reduced by approximately 50% or even more compared to sending the full partial inference data.

In an embodiment, consider that there are two entities in split computing environment as device-1 and device-2. Device-1 sends the 1st partial inference to Device-2. In an embodiment the partial inferences are sent. In an embodiment the difference in partial inference data compared to previous partial inference is sent. In an embodiment if Device-2 already has a previous partial inference data, it receives the difference in partial inference data from the client and constructs the new partial inference and feed to the AI model.

It may be noted in the present disclosure that the difference data sending is not limited to TLV/TVF format only and, any other technique (existing or developed in the future) which sends the difference data efficiently may be used with the techniques of the present disclosure. The disclosed protocol may support many such data differentiation sending techniques.

AConstruct Difference array in TLV (Tag, Length, Value) format: In an example first approach, the TLV byte array comprises a tag which represents the starting index, where byte is changed. The number of bytes required to store tag is dependent on the total size of the partial/full inference data to be transferred and is fixed for a given size. Length represents how many bytes changed from starting index. The number of bytes needed to specify length of the byte change is dynamic in nature and depends on the partial inference data. Value represents what are the changed values.

AConstruct Difference array in TVF (Tag, Value, Flag) format: In an example second approach, tag represents what the starting index is and where the byte is changed. The number of bytes required to store tag is dependent on the total size of the partial/full inference data to be transferred which is fixed for a given size. Value represents what are the changed values are. Flag is a unique character to represent end of value bytes in the TVF array. The advantage of this approach is that there is no need to use multiple bytes to represent the length variable instead use only one byte to mark the end of the value tag in TVF array. New inference is compared with the previous inference and a difference inference is generated in a TVF fashion. New inference is constructed using previous inference stored at receiver and a difference inference TLV data payload is received from sender.

For example, 1-12 layers run at the client and the output of the 12th layer is 295 KB. 2nd partial inference is compared with the 1st partial inference data, and only the difference is sent to the AI service module (TLV or TLF array) currently the size measured is approximate ~80 KB to 170 KB (Original size 295 KB).

AI service module stores the partial inference and executes the remaining layers. The service module receives the TLV or TLF array from the device-1. Using the 1st partial inference and TLV (TLF) array, it constructs the 2nd partial inference (295 KB). It runs the remaining layers and stores the 2nd partial inference for the next iteration/round.

Tensor data protocol in federated learning environment:

Federated learning (also known as collaborative learning) may refer, for example, to a machine learning technique that trains an algorithm across multiple decentralized edge devices or servers holding local data samples, without exchanging them.

In an embodiment, sending updated data to a federated server can be sent using a tensor data protocol. Clients share the updated model "weights & biases" to the Federated server using tensor data protocol. Federated servers aggregate all the data from the clients and update the model, and updated model "weights" are shared back to all clients using Tensor data protocol, client updates the local model with the received weights. In federated learning, updated global weights are sent to client devices using tensor data protocol.

Tensor data protocol in split federated learning environment:

In an embodiment, tensor data protocol in Split Federated Learning. The back propagation data in case of split federated learning is transferred back to clients using tensor data protocol. Weights and biases are transferred over network from cloud to client devices.

Tile based tensor data sending and receiving: If the client device is capable of sending parallel data, then the tensor data is divided into multiple tiles and sent to the receiver side. All tiles are having a parallel connection with the receiver device. Receiver device receives the data parallelly from multiple ports and combines all the tensor data and process. Since the data is sent/received in parallel, it saves data transfer times, hence improves latency.

In an embodiment the protocol can be extended to support the chunks to be sent parallelly and divide the tensor data into tiles and tag the tile number and send them in separate channel using tensor data protocol, at the receiving side using the tide numbers tensor protocol receives the inference data and constructs a partial inference.

In an example embodiment, the headers and blocks in tensor data protocol are as listed below:

Tensor data type: this field indicates what kind of a data this tensor is having.

Tensor stream ID: This field indicates tensor stream id, if there are multiple applications sending/receiving tensor data, or if the multiple streams are required for the same application as one stream for audio tensor data, one stream for video tensor data, one stream for text stream data. Using the stream id application can identify the type of data received. Unique tensor id is assigned to them, so that stream can be identified, and tensor data forwarded to a correct application. In an embodiment, stream id helps to identify each stream, so that each stream type data may be identified.

Tensor data payload: indicates the tensor data received from applications.

Tensor indexes: if the difference in partial inference data is sent/received, this block contains the index in previous partial inference where the tensor byte is changed.

New Partial inference: using Tensor indexes and previous partial inference, new partial inference is calculated, which is sent to applications.

Following are example advantages of the disclosure:

Single protocol to communicate all kind of AI/ML tensor data.

Tensor data protocol is programming languages agnostic.

Tensor data protocol is platform agnostic Ex: device-1 could be in android and device-2 could be in Linux.

Any AI services can be accessible using tensor data protocol, clients who are complaint to tensor data protocol can leverage.

In a distributed computing environment, when the DNN model execution is divided among two or more devices, sending the partial inference data from one client to another service module poses a heavy burden on the network due to its bulk size and increases latency.

Instead of streaming an entire chunk of partial inference data, if the difference between previous data and newly generated data is calculated and transferred whose size is less than complete data, latency can be saved, and network traffic can be reduced.

Partial inference data reduction is a new domain where little work has been done and the approach of present disclosure proves to be a working way where one can reduce transfer data by around 50% compared to original data. This can be a default way to communicate any tensor data between modules & devices.

Figure 2:
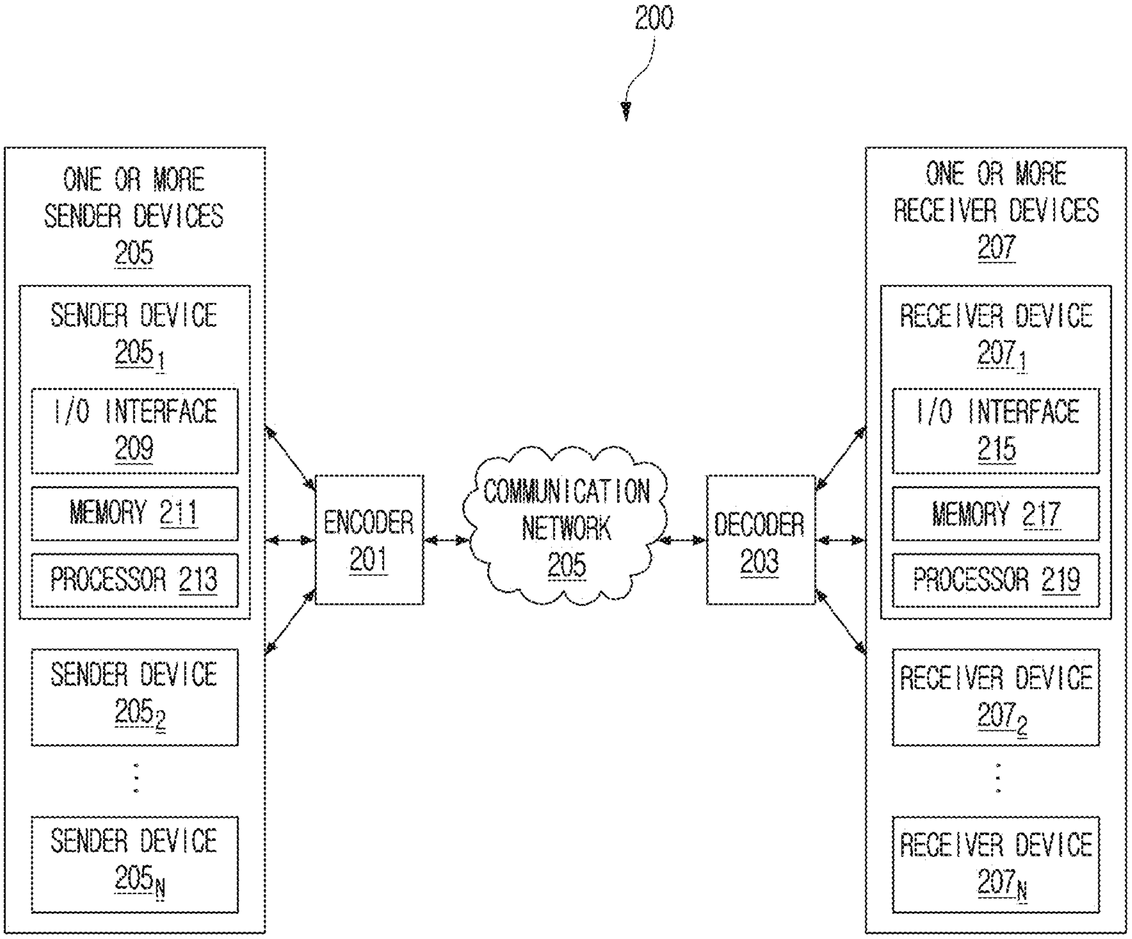
FIG. 2 is a diagram illustrating an example configuration of and method of managing communication of Artificial Intelligence (AI) data between devices in a computing environment, according to various embodiments.

FIG. 2 is a block diagram illustrating an example for managing communication of Artificial Intelligence (AI) data between devices in a computing environment, according to various embodiments. As shown, the environment 200 includes one or more sender devices 205 (such as, a sender device 2051, a sender device 2052, . . . and a sender device 205N, collectively referred as one or more sender devices 205), one or more receiver devices 207 (such as, a receiver device 2071, a receiver device 2072, . . . and a receiver device 207N, collectively referred as one or more receiver devices 207) and a communication network 205. The sender device 2051 comprises an I/O interface (e.g., including interface circuitry) 209, memory 211 and a processor (e.g., including processing circuitry) 213. Similarly, the receiver device 2071 comprises an I/O interface (e.g., including interface circuitry) 215, memory 217 and a processor (e.g., including processing circuitry) 219. For illustration purposes, the I/O interface (209, 215), memory (211, 215) and the processor (213, 219) are shown for sender device 2051 and the receiver device 2071 only. However, each of the sender device of the one or more sender devices 205 and receiver device of the one or more receiver devices 207 may comprise these components. The processors 213 and 219 may each include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions.

The environment 200 further comprises an encoder 201 and a decoder 203 at the sender's and the receiver's end, respectively. In an embodiment of the present disclosure, the communication of the AI data is managed between the one or more sender devices 205 and the one or more receiver devices 207 by transmitting the AI data based on a first codec technique and a second codec technique.

In an embodiment, each of the one or more sender devices 205 and the one or more receiver devices 207 may host and execute one or more AI applications and AI activities based on computing environments. The computing environments may include, but not limited to, a distributed AI data computing environment, a federated learning environment, a split-federated learning environment, a Multi-Agent-System (MAS) AI environment, Swarm Intelligence (SI) environments, and the like.

The one or more sender devices 205 generate a plurality of data frames for the one or more AI applications running on the corresponding one or more sender devices 205. The plurality of data frames comprises a previously generated data frame, a current data frame and an updated data frame. In an embodiment, a first data frame generated by a sender device such as, the sender device 2051, is transmitted to a receiver device 2071 without encoding the AI data. When a next data frame corresponding to be the current data frame is generated, the sender device 2051 may detect one or more sets of changes in data values associated with the current data frame. The sender device 2051 detects the one or more sets of changes based on performing a comparison between the current data frame and a previously generated data frame. In an embodiment, each set of change of the one or more sets of changes either correspond to a change in consecutive data values associated with the current data frame or correspond to two or more sets of changes in the consecutive data values associated with the current data frame.

In an embodiment, prior to detecting the one or more sets of changes in the data values associated with the current data frame, the sender device 2051 may select either the first codec technique or the second codec technique for transmitting the AI data associated with the AI application currently running on the sender device 2051. Accordingly, the sender device 2051 continuously monitors performance of the selected codec technique based on predefined performance parameters. The predefined performance parameters may include but are not limited to, network latency, data loss, number of transmission errors, network bandwidth, number of devices in the communication network 205, and the like. Further, based on the monitoring, the sender device 2051 may either perform switching of the selected codec technique to other codec technique or perform modification of the selected codec technique. In an embodiment, the modification may be performed by the sender device 2051 by selecting either a different layer of an AI model or a different type of the AI model, associated with the AI application to perform the transmission of the AI data.

Further, the sender device 2051 may simultaneously perform generating of one or more data chunks comprising one or more data segments of the updated data frame. The one or more data chunks are generated based on the one or more sets of changes, for the current data frame. The one or more data chunks are generated based on either the first codec technique or the second codec technique. Subsequently, the sender device 2051 may transmit the one or more data chunks which are generated for the updated data frame to the one or more receiver devices 207 when the respective data chunk satisfies a predefined chunk size. The predefined chunk size corresponds to a size of the chunk which is accepted by the encoder 201 and the decoder 203.

In an embodiment, the one or more data segments associated with the one or more data chunks which are generated based on the first codec technique comprises of an index value (I), a size(S) and changed data values (V). In an embodiment, for a first data segment of the one or more data segments associated with a first data chunk, the index value (I) is indicative of an index which may correspond to a first change in a first set of changes of the one or more sets of changes present in the current data frame. In an embodiment, for the one or more data segments other than the first data segment associated with the first data chunk, the index value (I) is indicative of total number of unchanged data values between two consecutive sets of changes of the one or more sets of changes present in the current data frame. Further, the size(S) may be indicative of total number of changed data values which may be associated with the one or more sets of changes in the current data frame. The changed data values (V) are associated with the one or more sets of changes in the current data frame.

Figure 6A:
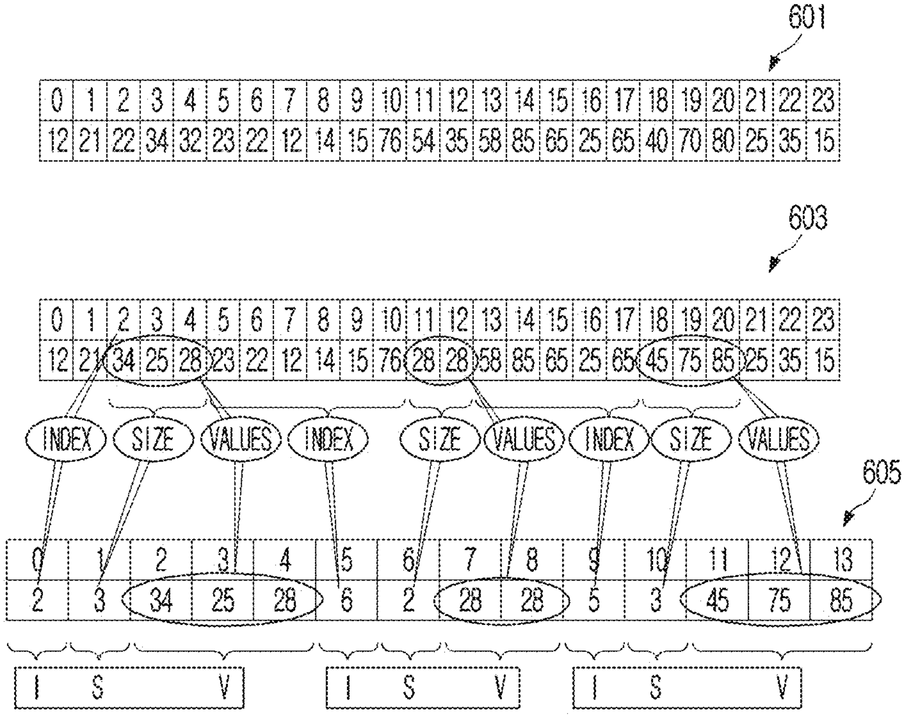
FIGS. 6A and 6B are diagrams illustrating examples of managing communication of AI data by a sender device using a first codec technique and second codec technique, respectively according to various embodiments.

As shown in FIG. 6A, a previously generated data frame 601 comprises data values and a current data frame 603 comprises changed data values (V). For example, as shown in FIG. 6A, an updated data frame 605 comprises a data chunk comprising three data segments. As seen from FIG. 6A, for the first data segment, a first change in the current data frame is detected at index '2', the size of the changed data values corresponds to '3' and the changed data values correspond to '34, 25, 28'. Therefore, the first data segment in the updated data frame 605 comprises the index value (I) which corresponds to '2', the size(s) of the changed data values which corresponds to '3' and the changed data values (V) which correspond to '34, 25, 28'.

Returning to FIG. 2, in an embodiment, the one or more data segments associated with the one or more data chunks which are generated based on the second codec technique comprises of an index value (I), changed data values (V) and a flag (F). According to the second codec technique, the index value (I) and changed data values (V) indicate same data values as described under the first codec technique. However, according to the second code technique, the updated data frame does not comprise of data values associated with size(S) of the changed data values. Instead, the updated data frame comprises the data values for the flag (F) which indicates an end of the respective data segment.

Figure 6B:
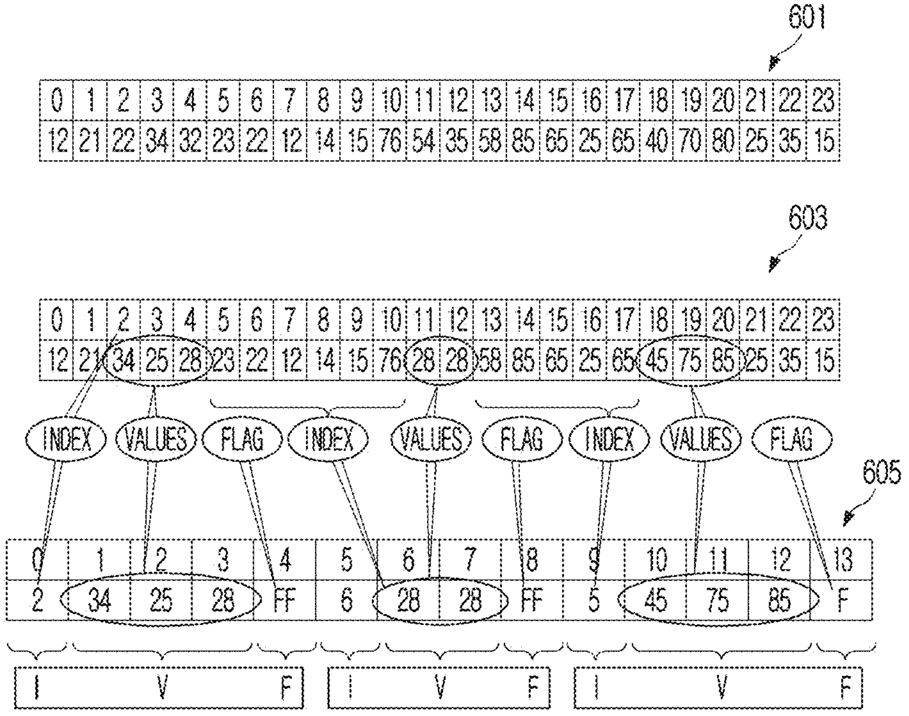

For example, as shown in FIG. 6B, a previously generated data frame 601 comprises data values and a current data frame 603 comprises changed data values (V). Further an updated data frame 605 comprises a data chunk comprising three data segments. As seen from FIG. 6B, for the first data segment, a first change in the current data frame is detected at index '2', the changed data values correspond to '34, 25, 28' and a last data value of a first segment corresponds to 'FF'. Therefore, the first data segment in the updated data frame 605 comprises the index value (I) which corresponds to '2', the changed data values (V) which correspond to '34, 25, 28' and the flag (F) which corresponds to 'FF' indicating the end of the first data segment.

Returning to FIG. 2, in an embodiment, when the sender device 2051 performs data transmission based on the first codec technique, an additional data segment is generated when the size of the one or more sets of changes exceeds a predefined index size. The predefined index size corresponds to a size of the index which is accepted by the encoder 201 and the decoder 203. The generation of the additional data segment is performed by first identifying whether the size associated with the respective one or more sets of changes in the current data frame exceeds the predefined index size. Further, when the sender device 2051 identifies that the size associated with the respective one or more sets of changes is exceeding the predefined index size, the sender device 2051 may determine an exceeding size for the respective one or more sets of changes based on the size and the predefined index size. Thereafter, the sender device 2051 generates the additional data segment for each of the one or more sets of changes associated with the exceeding size.

In an embodiment, prior to the generation of the one or more data chunks for the updated data frame, the sender device 2051 determines a size of the updated data frame based on the one or more sets of changes. Accordingly, the sender device 2051 generates the one or more data chunks only when the size of the updated data frame is less than a predefined range of size associated with the current data frame. The predefined range of size is a size which may be agreed between the sender device 205 and the receiver device 207, for performing transmission of the data frames. Further, the one or more data chunks which are generated for the updated data frame are transmitted to the one or more receiver devices 207 only when the size of the updated data frame is within the predefined range of size.

For example, consider the predefined range of size corresponds to 15 bytes to 20 bytes and the size of the updated data frame corresponds to 10 bytes, which is less than the predefined range of size, 15 bytes to 20 bytes. The sender device 2051 generates the one or more data chunks for the updated data frame. Further, in another example, consider the size of the updated data frame corresponds to 18 bytes, which falls within the predefined range of size corresponds to 15 bytes to 20 bytes. In such case, the sender device 2051 may not proceed with generating the one or more data chunks for the updated data frame. Instead, the sender device 2051 proceeds with transmitting the updated data fame without generation of the one or more data chunks comprising the changed data values.

Figure 7:
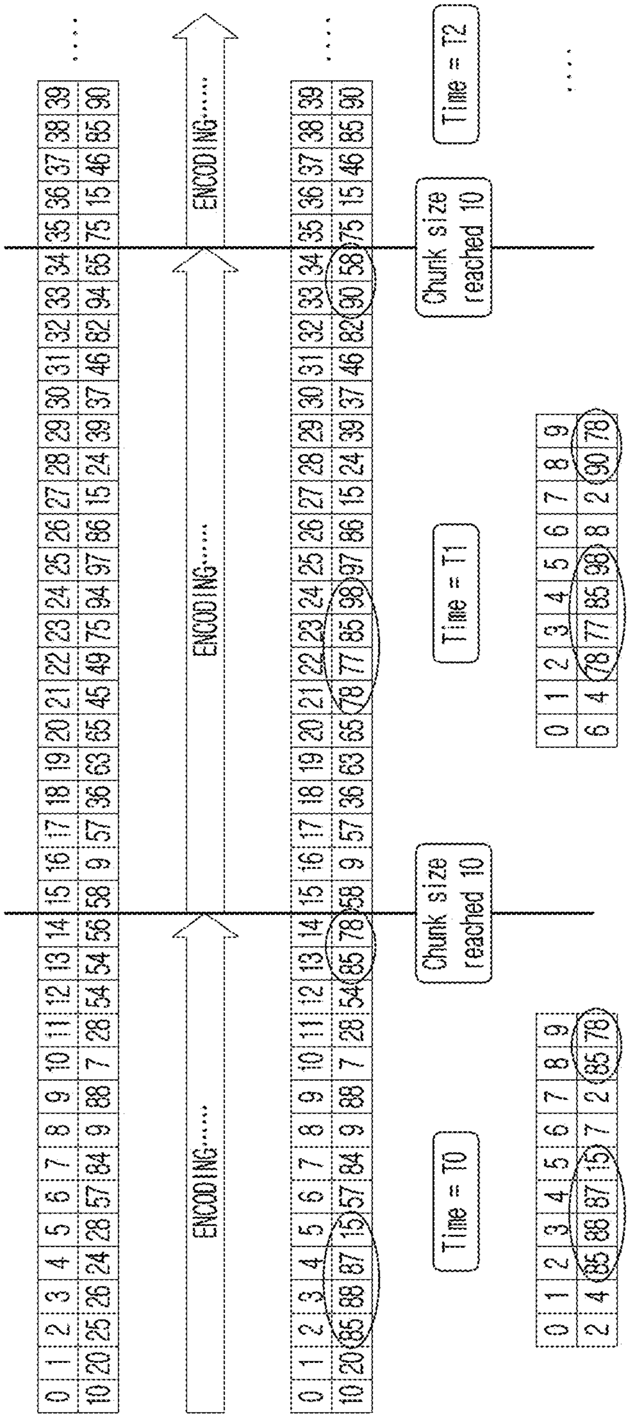
FIG. 7 is a diagram illustrating an example of encoding AI data at sender device, according to various embodiments.

According to the present disclosure, the one or more data chunks generated for the updated data frame are transmitted to one or more receiver devices 207 only when the respective data chunk satisfies the predefined chunk size. For example, FIG. 7 shows encoding the one or more data segments based on the predefined chunk size. As seen, the predefined chunk size corresponds to 10 bytes. According to the first codec technique, the index value (I) and the size of the changed data values(S) require two bytes to indicate the respective values. Further, according to the second codec technique, the index value (I) and the flag (F) require 2 bytes to indicate the respective values. Thus, for both the codec techniques, two bytes are fixed, and remaining bytes are available for the changed data values (V). As seen from FIG. 7, a first data chunk comprises two data segments. The first data segment comprising four bytes of changed data values and the second data segment comprises two bytes of changed data values. Therefore, when the total bytes of the first data segment are added with total bytes of the second data segment, it sums up to 10 bytes. The following shows the summing up of the data values for the first data chunk comprising two data segments.

$$\text{Data Segment 1} = 1 \text{ byte (Index value)} + 1 \text{ byte (Size of the changed data values)} + 4 \text{ bytes (Total number of changed data values)}$$

$$\text{Data Segment 2} = 1 \text{ byte (Index value)} + 1 \text{ byte (Size of the changed data values)} + 2 \text{ bytes (Total number of changed data values)}$$

$$\text{Data Chunk 1} = \text{Data Segment 1} + \text{Data Segment 2} = 1 \text{ byte} + 1 \text{ byte} + 4 \text{ bytes} + 1 \text{ byte} + 1 \text{ byte} + 2 \text{ bytes} = 10 \text{ bytes}$$

Therefore, as per the example, according to the predefined chunk size, in the first data chunk, only two data segments can be accommodated. Thus, at time TO, the first data chunk that comprises only two data segments from the updated data frame, are transmitted to the one or more receiver devices 207. According to the present disclosure, when the transmission of the one or more data chunks is performed, the sender device 2051 parallelly performs decoding of the next set of one or more changes based on the predefined chunk size.

In an embodiment, the predefined chunk size is calculated based on encoding capability of the one or more sender devices 205 and network throughput between the one or more sender devices 205 and one or more receiver devices 207.

The present disclosure provides a mechanism to calculate an optimal chunk size such that encoding and sending of data can be performed in minimum time. An optimal chunk size is computed considering packet loss in case of a network congestion. In an example, two variables, such as, Cmin and Cvar are used in the present disclosure. Herein, the Cmin is the initial value of the chunk measured based on the bandwidth of the network by the present disclosure. Cvar is the incremental value considered to find the optimal chunk based on the minimum stalling time by the network or the encoder of the sender device 2051. Further, time delay is computed which corresponds to delay between creating/generating respective data chunks. The sender device 205 selects a minimum chunk size and keeps incrementing the chunk size based on Cvar to find out the minimum stalling for each of the decided chunk sizes. In an embodiment, the chunks for which the stalling time is minimum is considered optimal. A minimum chunk size is selected and chunk size is incremented continuously based on the Cvar to identify the minimum stalling for each of the decided chunk sizes. The chunk for which the stalling time is minimum is considered optimal. According to the present disclosure, a minimum chunk size is selected, wherein the minimum chunk size keeps incrementing chunk size based on Cvar to find out the minimum stalling for each of the decided chunk sizes. The chunk for which the stalling time is minimum is considered optimal. In an embodiment, during the network congestion, the network calculates the packet loss (p %) and the sender device 205 accordingly adjusts the chunk size.

In an embodiment, prior to transmitting the one or more data chunks to the one or more receiver devices 207, the sender device 2051 may perform transmission of a request which comprises AI metadata description associated with the one or more data chunks. Thereafter, the sender device 2051 receives a response from the one or more receiver devices 207. The response may comprise at least one negotiated parameter for the transmitted AI metadata description. For example, negotiated parameters may include, but not limited to, codec related information such as codec technique, chunk size, tensor change index, modify codec, and the like. The negotiated parameters are exchanged based on predefined session protocols, which may include, but are not limited to, Session Description Protocol (SDP), Hypertext Transfer Protocol (HTTP), Transmission Control Protocol (TCP), User Datagram Protocol (UDP) headers, custom messages, and the like. Therefore, the transmission of AI data takes place after the AI metadata description is negotiated between the one or more sender devices 205 and the one or more receiver devices 207.

Further, the one or more receiver devices 207 may receive the one or more data chunks of the updated data frame for the corresponding AI application which is running on the sender device 2051. In an embodiment, the one or more receiver devices 207 may receive a first data frame which may not be an encoded data frame. Further, when the next data frame corresponding to the current data frame is received, the receiver device 2071 takes a reference from the previously decoded data frame of the AI application. Similar to the one or more sender devices 205, each of the one or more data segments which are received as encoded data segments which may be encoded based either the first codec technique or the second codec technique.

Further, for each of the one or more data chunks, a decoded data chunk is generated by the receiver device 207 by decoding each of the one or more data segments corresponding to the respective data chunks. In an embodiment, generating the decoded data chunk based on the first data chunk comprises identifying in the previously decoded data frame an index associated with one of, the changed data values (V), and a combination of changed data values and unchanged data values in the corresponding data segment. Further, the one or more receiver devices 207 may identify total number of unchanged data values between the current data frame and the previously decoded data frame, based on the index value and the size associated with the respective data segment. Furthermore, the receiver device 2071 obtains the changed data values (V) from the respective data segment and the unchanged data values from the previously decoded data frame. The changed data values (V) are obtained for the identified index associated with the changed data values (V) based on the size(S) indicated in the updated data frame. The unchanged data values are obtained based on the identified index associated with the unchanged data values and the identified total number of unchanged data values associated with the respective data segment. In an embodiment, identifying the index comprises adding the size(S) of the current data segment that the receiver is reading for decoding, with a previous index value (I) associated with the respective data segment. Thereafter, the one or more receiver devices 207 generate the decoded data chunk based on the obtained changed data values (V) and the unchanged data values.

Figure 8A:
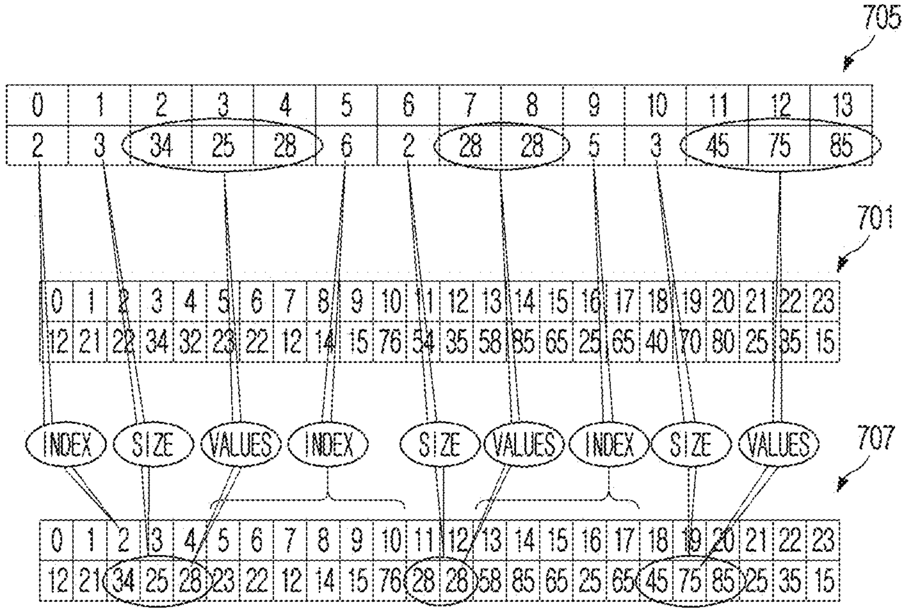
FIGS. 8A and 8B are diagrams illustrating examples of managing communication of AI data by a receiver device using first codec technique and second codec technique, respectively according to various embodiments.

For example, FIG. 8A shows an updated data frame 705, a previously decoded data frame 701 and current data frame 707. As above described, the one or more receiver devices 207 may refer from the previously decoded data frame 701 and generate the current data frame 707. For instance, as shown in FIG. 8A, a first data segment in the updated data frame 705 comprises the index value (I) as 2, size(S) of the changed data values as 3 and the changed data values correspond to '34, 25, 28'. Therefore, the receiver device 2071 reads the values in the updated data frame 705 and compares with the previously decoded data frame 701. In an embodiment, the size of the changed data values, for the first data segment of the first data chunk is obtained by identifying the index at which the change is occurred. Whereas, for the data segments apart the first data segment, the index value is obtained by identifying the number of unchanged data values between the consecutive sets of changes after the first data segment. For example, in FIG. 8A, the index value for the first data segment corresponds to 2 in the updated data frame 705, accordingly in the current data frame 707, it is noticed that the changes in the data values begin at the 2nd index as mentioned in the first data segment of the updated data frame 705. Whereas the index value for a second data segment in the updated data frame 705 corresponds to 6. As noticed from the current data frame, the total number of unchanged data values between first set of changes and second set of changes corresponds to 6. Similarly, the total number of unchanged data values between the second set of changes and the third set of changes corresponds to 5. Therefore, the receiver device 203 generates the current data frame based on the data values retrieved from the updated data frame 705 with reference to the previously decoded data frame 701.

Further, generating the decoded data chunk based on the second codec technique comprises identifying in the previously decoded data frame an index associated with one of, changed data values (V), and a combination of changed data values (V) and unchanged data values in the previously decoded data frame. The one or more receiver devices 207 perform identification based on an index value (I), a flag (F) and a size(S) indicative of total number of the changed data values. The one or more receiver devices 207 identify total number of unchanged data values based on the index value (I). Further, similar to the first codec technique, the one or more receiver devices 207 perform comparison between the updated data frame and the previous data frame to obtain the changed data values (V) from the respective data segment and the unchanged data values from the previously decoded data frame. The changed data values (V) are obtained for the identified index associated with the changed data values based on the flag (F). Further, the unchanged data values are obtained based on the identified index associated with the unchanged data values and the identified total number of unchanged data values associated with the respective data segment. In an embodiment, identifying the index comprises adding the size(S) of the current data segment that the receiver has received for decoding, with a previous index value (I) associated with the respective data segment. Thereafter, the one or more receiver devices 207 generate the decoded data chunk based on the obtained changed data values (V) and the unchanged data values.

Figure 8B:
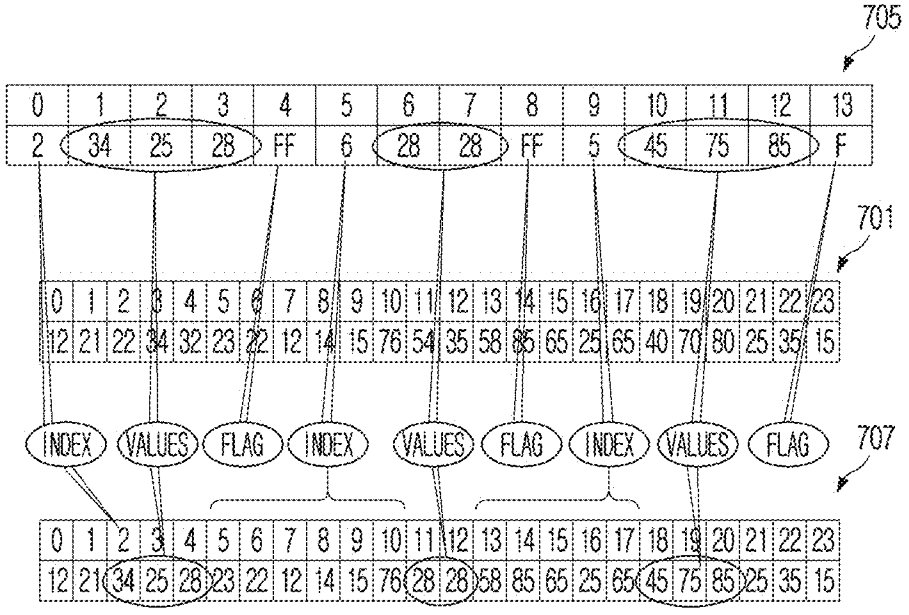

For example, in FIG. 8B, similar to the first codec technique, the second codec technique comprises generation of the current data frame 707. For instance, as shown in FIG. 8B, a first data segment in an updated data frame 705 comprises the index value (I) as 2, the changed data values correspond to '34, 25, 28', which is followed by an indication of flag (FF). Thus, the receiver device 2071 reads the values in the updated data frame 705 and compares with the previously decoded data frame 701. Once the flag is encountered, the receiver device 2071 identifies the index value (I) for the next data segment. Thus, in order to identify the next index value (I), the receiver device 2071 may obtain the index (I) of the next data segment of the updated data frame 705 and adds the index value of the last index of the changed data values and increases the index value by the count of 1 as the data frame starts from an index 0. For example, once the receiver device 2071 completes decoding the first data segment comprising the changed data values that correspond to '34, 25, 28', the receiver device 2071 reads the index value (I) of the next data segment in the updated data frame. According to FIG. 8B, the index value (I) corresponds to six and the last index of the previous data segment in the current data frame 707 corresponds to 4. Therefore, on performing addition, we obtain a value of 10, to which 1 is added as mentioned above. As a result, the next index value identified is 11. Therefore, the changed data values associated with the current data segment are placed from the index of 11 in the updated data frame 707. This is repeated for all the sets of changes.

In an embodiment, prior to receiving the one or more data chunks from the one or more sender devices 205, the one or more receiver devices 207 receive a request comprising AI metadata description associated with the one or more data chunks. The one or more receiver devices 207 are further configured to perform generating and transmitting a response comprising at least one negotiated parameter for the transmitted AI metadata description, to the one or more sender devices 205. Furthermore, predefined session protocols may be used to perform negotiation between the one or more sender devices 205 and the one or more receiver devices 207.

Figure 9:
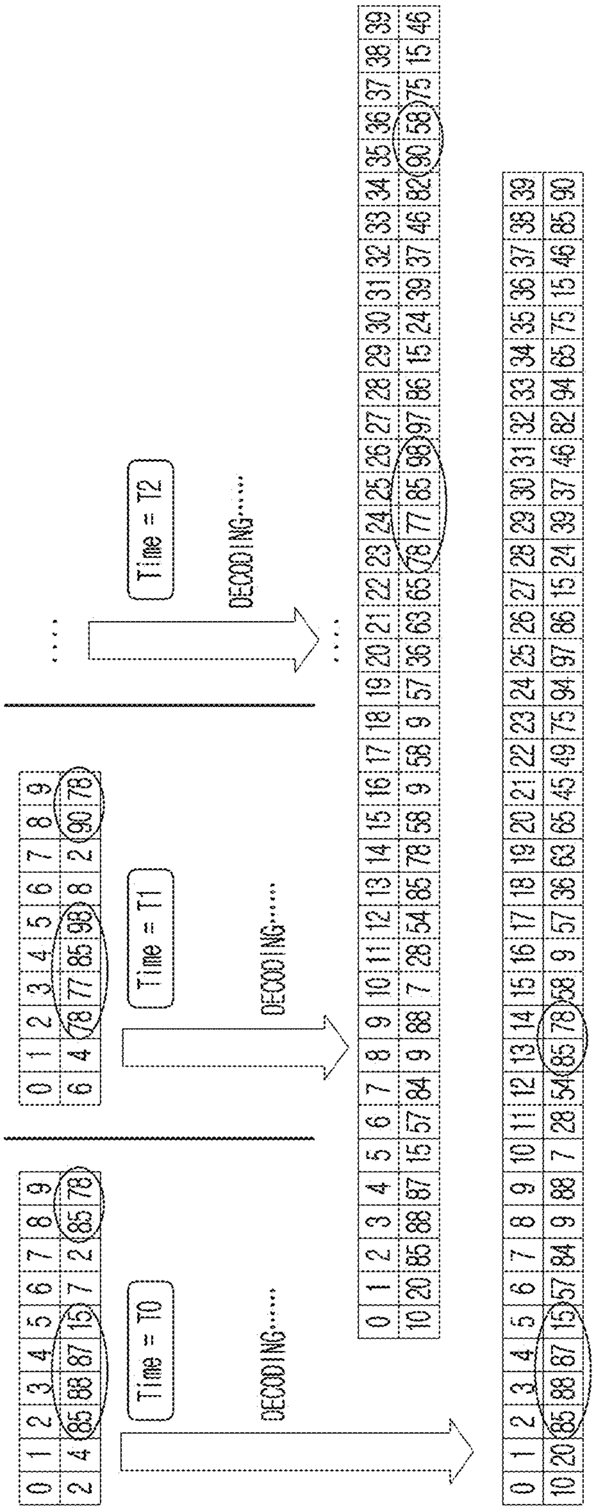
FIG. 9 is a diagram illustrating an example of decoding AI data at receiver device, according to various embodiments.

Further, as shown in FIG. 9, similar to the one or more sender devices 205, the one or more receiver devices 207 may also receive and decode the one or more data chunks parallelly. As seen from FIG. 9, at time TO the first data chunk is received and at T1 and T2 further data chunks are received.

Figure 3:
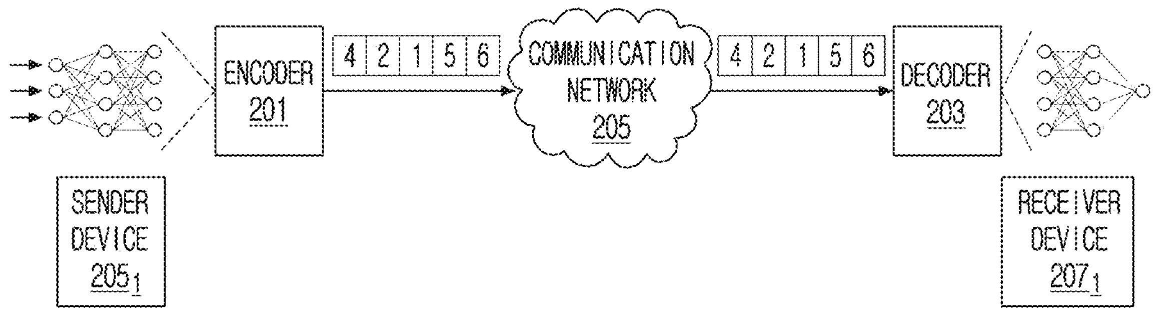
FIG. 3 is a block diagram illustrating an example of transmitting AI data in a split computing environment, according to various embodiments.

FIG. 3 is a block diagram illustrating an example of transmitting AI data in a split computing environment according to various embodiments. In the split computing environment, machine learning models are operated partially on a plurality of devices. The one or more sender devices 205 execute a part of the machine learning model and transmit the AI data comprising partial inference data to the one or more receiver devices 207, to run remaining part of the machine learning model. In an embodiment, when size of the AI data at the one or more sender devices 205 is very large, which for example, may corresponds to hundreds of KB's, the AI data is transmitted in continuous data streams using one of, the first codec technique or the second codec technique. The AI data is encoded and decoded based on previously transmitted AI data.

Figure 4A:
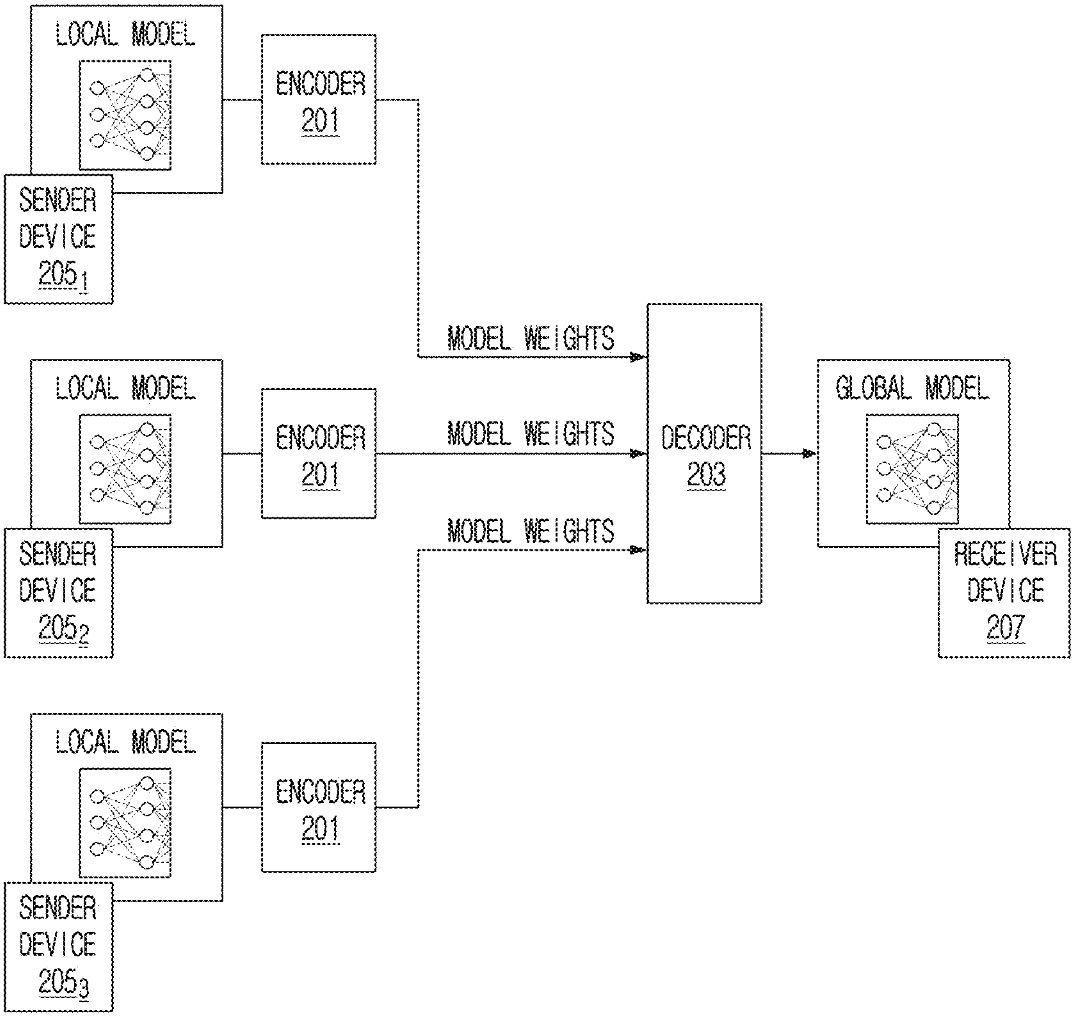
FIGS. 4A and 4B are block diagrams illustrating examples of transmitting AI data in a federated learning environment, according to various embodiments.
Figure 4B:
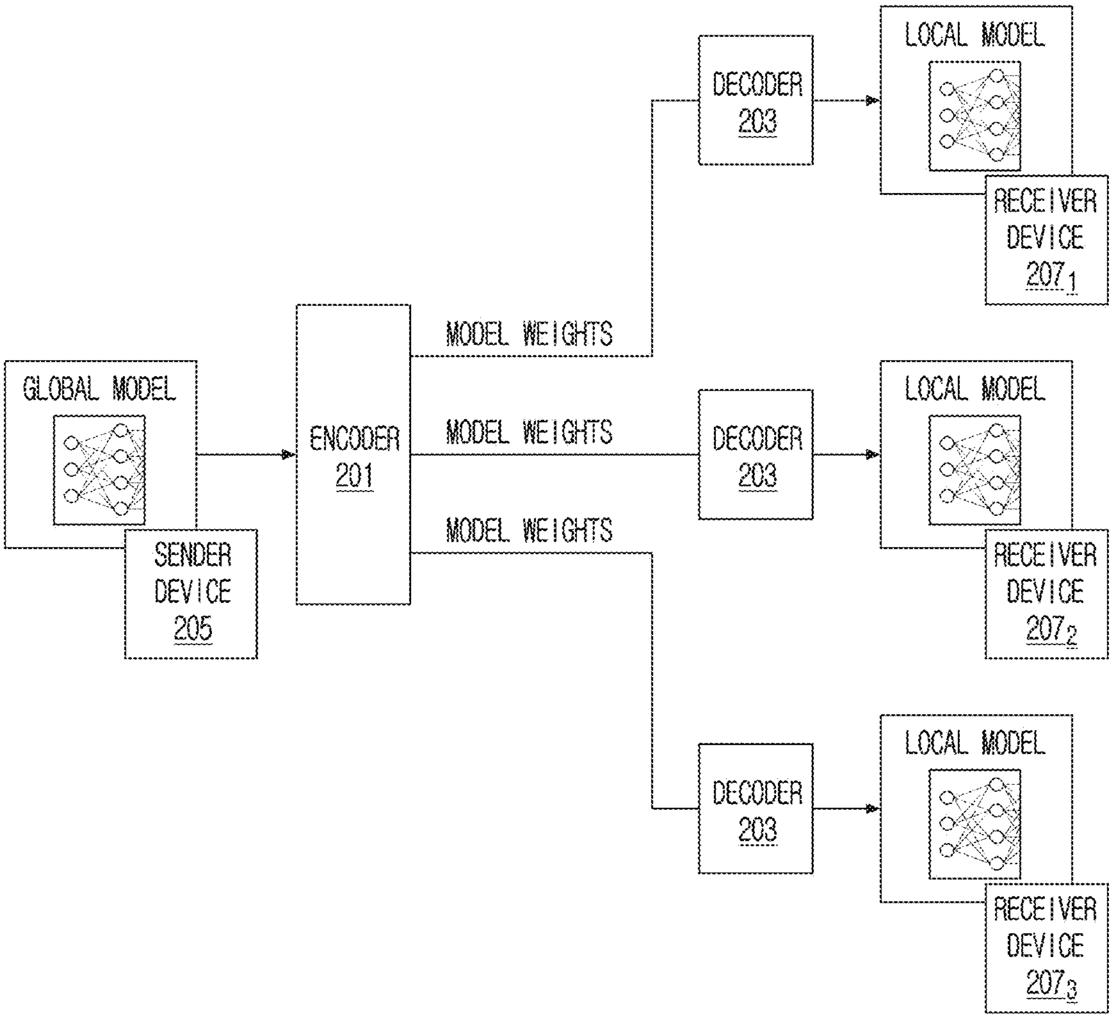

FIGS. 4A and 4B are block diagrams illustrating examples of transmitting AI data in a federated learning environment according to various embodiments. For example, FIG. 4A illustrates shows transmission of AI data from one or more sender devices 205 to a receiver 207. In an embodiment, the one or more senders 205 may be associated with one or more clients (client devices) and the receiver device 2071 may be associated with a federated server. Further, FIG. 4B illustrates transmission of AI data from a sender device 205-to one or more receiver devices 2071-3. In an embodiment, the sender device 205 may be associated with a federated server and the one or more receiver devices 207 may be associated with one or more clients. In the federated learning environment, a client may include a local model for each of the one or more sender devices 205. The local model may be trained using local data that is retrieved from each of the corresponding one or more sender devices 205 associated with the one or more clients. Once the training is completed, model weights and biases are transferred from the client to the corresponding federated servers. Further, the federated server may include a global model that comprises decoded data corresponding to updated model weights and biases. Once the global model receives the updated model weights and biases from all the one or more clients, the federated server performs a function to average out all the model weights and biases received from the clients. Further the AI data comprising the updated model weights and biases may be shared by the federated server with all the clients to update the local model. According to the present disclosure, an encoder 201 is used to encode the AI data before transmitting it to the receiver device 207. Further, a decoder 203 is used by the one or more receiver devices 207 to decode the AI data.

Figure 5A:
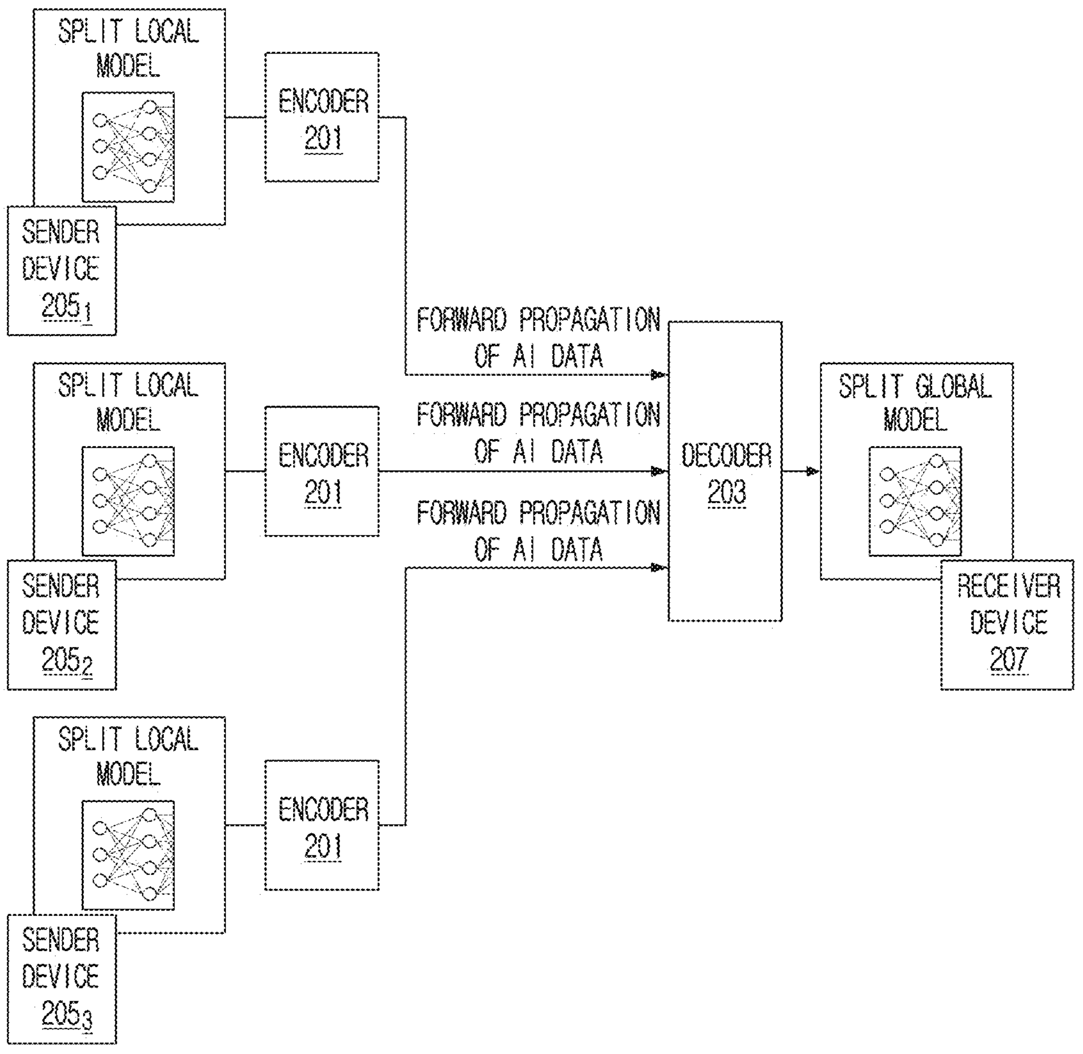
FIGS. 5A and 5B are block diagrams illustrating examples of transmitting AI data in a split federated learning environment, according to various embodiments.
Figure 5B:
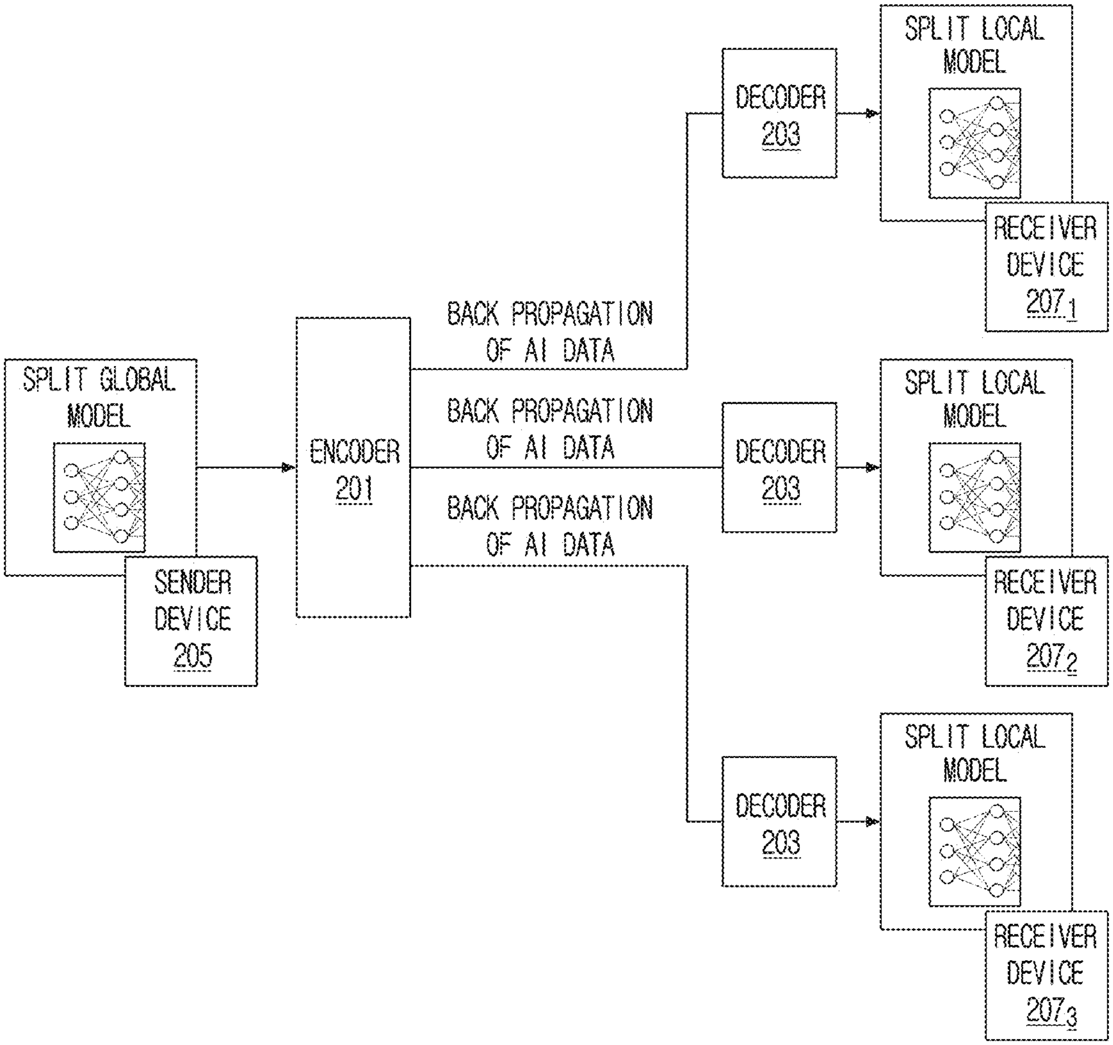

FIGS. 5A and 5B are block diagrams illustrating examples of transmitting AI data in a split federated learning environment according to various embodiments. For example, FIG. 5A illustrates transmission of AI data from the one or more sender devices 205 to a receiver device 207. In an embodiment, the one or more senders 205 may be associated with one or more clients and the receiver device 207 may be associated with a split federated server. FIG. 5B illustrates transmission of AI data from a sender device 205 to one or more receiver devices 207. In an embodiment, the sender device 205 may be associated with a split federated server and the one or more receiver devices 207 may be associated with one or more clients. In a split federated learning environment, a client may include a split local model for each of the one or more sender devices 205. The split local model may be trained using the local data that is retrieved from each of the corresponding one or more sender devices 205 associated with the clients. The one or more sender devices 205 may transfer a forward propagation output generated after executing the split local model from the client to the corresponding split federated server. Further, the split federated server may include a split global model that comprises decoded data corresponding to updated model weights and biases. Once the split global model receives the updated model weights and biases from all the clients, the split federated server performs a function to average out all the model weights and biases received from the clients. Further the AI data comprising the updated model weights and biases may be shared by the split federated server with all the clients by performing back propagation, to update the local model.

Figure 10:
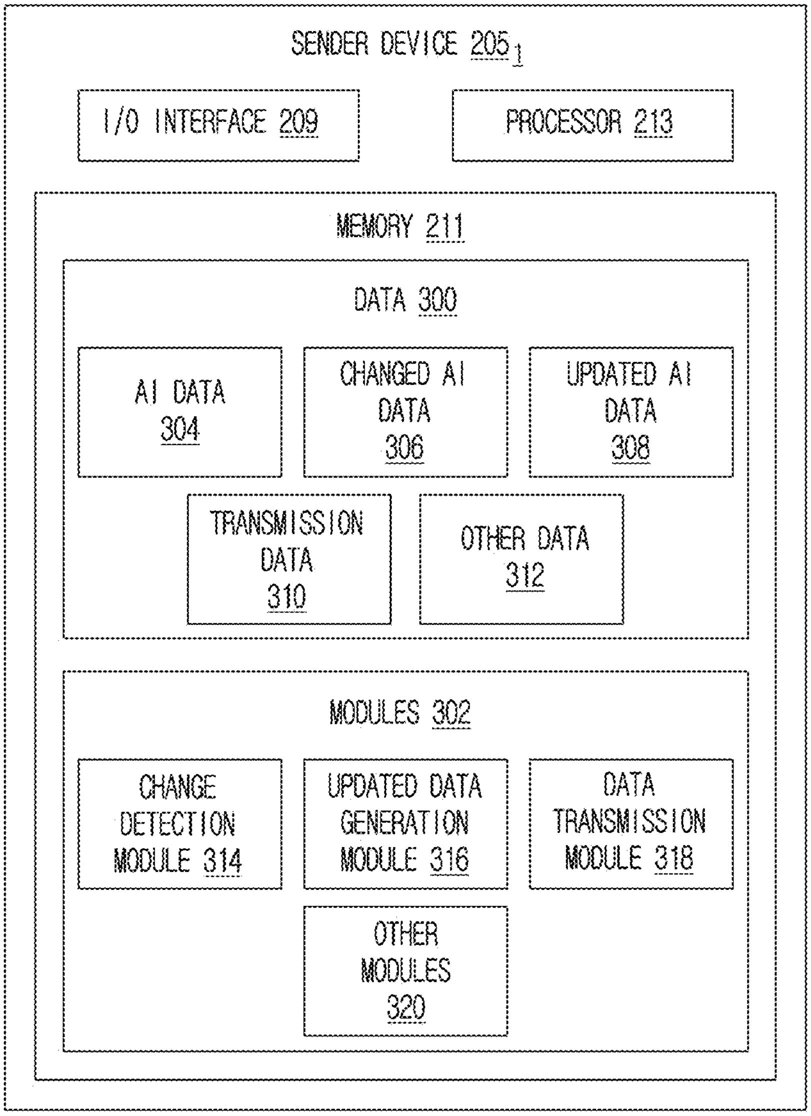
FIG. 10 is a block diagram illustrating an example configuration of a sender device, according to various embodiments.

FIG. 10 is a block diagram illustrating an example configuration of a sender device according to various embodiments.

FIG. 10 illustrates an internal architecture of one or more sender device 205 in accordance with various embodiments of the present disclosure. The sender device 2051 may include at least one Central Processing Unit ("CPU" or "processor") (e.g., including processing circuitry) 213 and a memory 211 storing instructions executable by the at least one processor 213. The processor 213 may comprise at least one data processor for executing program components for executing user or system-generated requests. The memory 211 is communicatively coupled to the processor 213. The sender device 2051 further comprises an Input/Output (I/O) interface (e.g., including interface circuitry) 209. The I/O interface 209 is coupled with the processor 213 through which an input signal or/and an output signal is communicated. According to various embodiments, the processor 213 may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions.

In various implementations, the sender device 205 may include data 300 and modules 302. In an example implementation, the modules 302 may include, for example, a change detection module 314, an updated data generation module 316, a data transmission module 318, and other modules 320. Each of the modules may include various executable program instructions. It will be appreciated that such aforementioned modules 302 may be represented as a single module or a combination of different modules. In an example implementation, the data 208 data 300 may include, for example, AI data 304, changed AI data 306, updated AI data 308, transmission data 310 and other data 312. In various embodiments, the data 300 may be stored in the memory 211 in form of various data structures.

The AI data 304 may comprise data related to the AI application running on the sender device 2051 along with AI data associated with previously generated data frames.

The changed AI data 306 corresponds to the modified AI data that includes one or more changes in data values of a current frame with respect to a previously generated frame.

The updated AI data 308 comprises one or more sets of changes in the data values of the current data frame on comparing with the previously generated data frame.

The transmission data 310 comprises the AI data which is processed for transmitting to the one or more receiver devices 207.

The other data 310 may store data, including temporary data and temporary files, generated by the one or more modules 310 for performing the various functions of the sender device 2051. The one or more modules 310 may also include the other modules 320 to perform various miscellaneous functionalities of the sender device 205. The other data 310 may be stored in the memory 204. It will be appreciated that the one or more modules 310 may be represented as a single module or a combination of different modules.

In an embodiment, the change detection module 314 is configured to detect one or more sets of changes in data values associated with a current data frame. The change detection module 314 first receives data frames from other modules 320 and further detects the changes in the data values by performing a comparison between the current data frame and a previously generated data frame.

In an embodiment, the updated data generation module 316 is configured to receive the changed AI data 306 from the change detection module 314 and further generate one or more data chunks of an updated data frame for the current data frame. The updated data frame comprising one or more data segments based on the one or more sets of changes. The updated data generation module 316 generates the one or more data chunks based on either the first codec technique or the second codec technique as described under FIG. 2 description. The updated data generation module 316 further identifies whether a size(S) associated with the respective one or more sets of changes in a current data frame, exceeds a predefined index size. The updated data generation module 316 further determines the exceeding size for the respective one or more sets of changes based on the size(S) and the predefined index size, when the size(S) associated with the respective one or more sets of changes exceeds the predefined index size. The updated data generation module 316 further generates an additional data segment for each of the one or more sets of changes associated with the exceeding size. The additional data segment comprises the exceeding size and changed data values (V), corresponding to the one or more sets of changes.

The transmission module 310 receives the updated AI data 308 from the updated data generation module 316 and performs transmission of the received updated AI data 308. The transmission module 310 is also configured to transmit a request comprising AI metadata description associated with the one or more data chunks, to the one or more receiver devices 207 prior to transmission of the one or more data chunks. The transmission module 310 is further configured to receive a response from the one or more receiver devices 207. The response may comprise at least one negotiated parameter for the transmitted AI metadata description.

Figure 11:
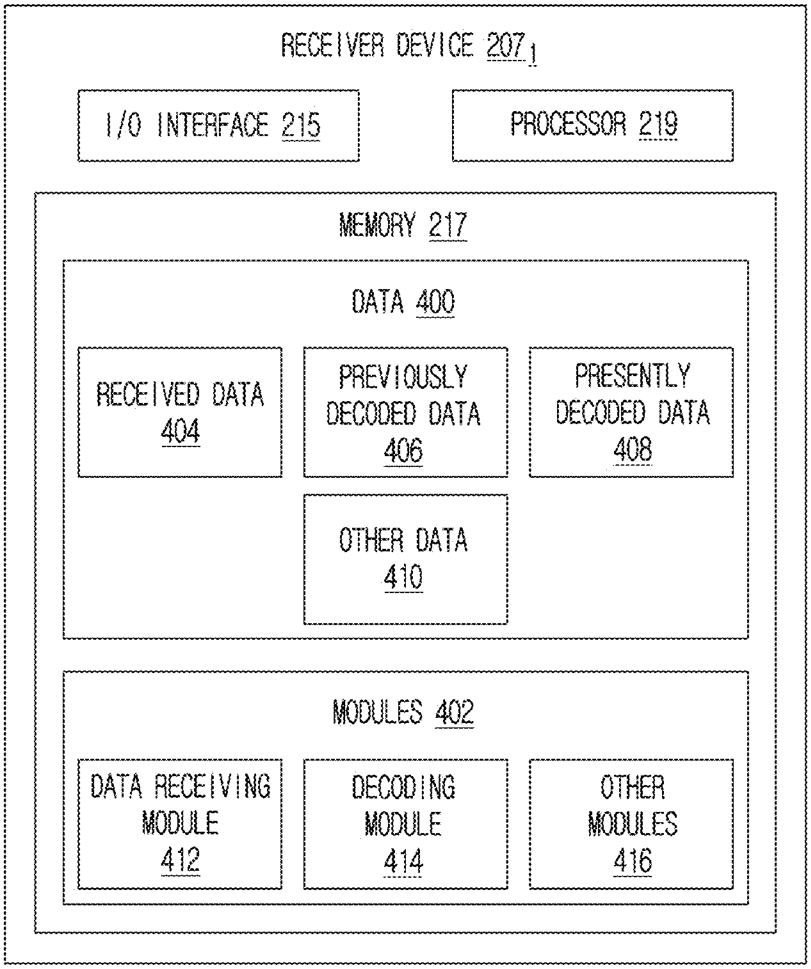
FIG. 11 is a block diagram illustrating an example configuration of a receiver device, according to various embodiments.

FIG. 11 is a block diagram illustrating an example configuration of a receiver device according to various embodiments.

FIG. 11 illustrates an internal architecture of the receiver device 2071 in accordance with various embodiments of the present disclosure. The sender device 2051 may include at least one Central Processing Unit ("CPU" or "processor") (e.g., including processing circuitry) 219 and a memory 217 storing instructions executable by the at least one processor 219. The processor 219 may comprise at least one data processor for executing program components for executing user or system-generated requests. The memory 217 is communicatively coupled to the processor 219. The receiver device 207 further comprises an Input/Output (I/O) interface (e.g., including interface circuitry) 215. The I/O interface 215 is coupled with the processor 219 through which an input signal or/and an output signal is communicated. The processor 219 may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions.

In various implementations, the sender device 205 may include data 400 and modules 402. In an example implementation, the modules 402 may include, for example, a data receiving module 412, a decoding module 414, and other modules 416. The various modules may include various executable program instructions. It will be appreciated that such aforementioned modules 402 may be represented as a single module or a combination of different modules. In one implementation, the data 400 may include, for example, received data 404, previously decoded data 406, presently decoded data 408 and other data 410. In various embodiments, the data 400 may be stored in the memory 217 in form of various data structures.

The previously decoded data 406 may comprise of the one or more data frames comprising the AI data sent by the one or more sender devices 205. The previously decoded data 406 may be received from the one or more sender devices 205.

The presently decode data 408 may comprise of one or more data frames comprising the AI data associated with changed data values.

The other data 410 may store data, including temporary data and temporary files, generated by the one or more modules 402 for performing the various functions of the receiver device 205. The one or more modules 402 may also include the other modules 416 to perform various miscellaneous functionalities of the sender device 205. The other data 410 may be stored in the memory 217. It will be appreciated that the one or more modules 402 may be represented as a single module or a combination of different modules.

In an embodiment, the data receiving module 412 is configured to receive one or more data chunks of an updated data frame for an AI application. Each of the one or more data segments are received as encoded data segments by the data receiving module 412. The data receiving module 412 encodes the one or more data chunks by the first codec technique and the second codec technique as explained in greater detail above with reference to FIG. 2.

In an embodiment, the decoding module 414 is configured to generate a decoded data chunk for each of the one or more data chunks by decoding each of the one or more data segments. The decoding module 414 performs the decoding based on either the first codec technique or the second codec technique as explained under FIG. 2.

Figure 12:
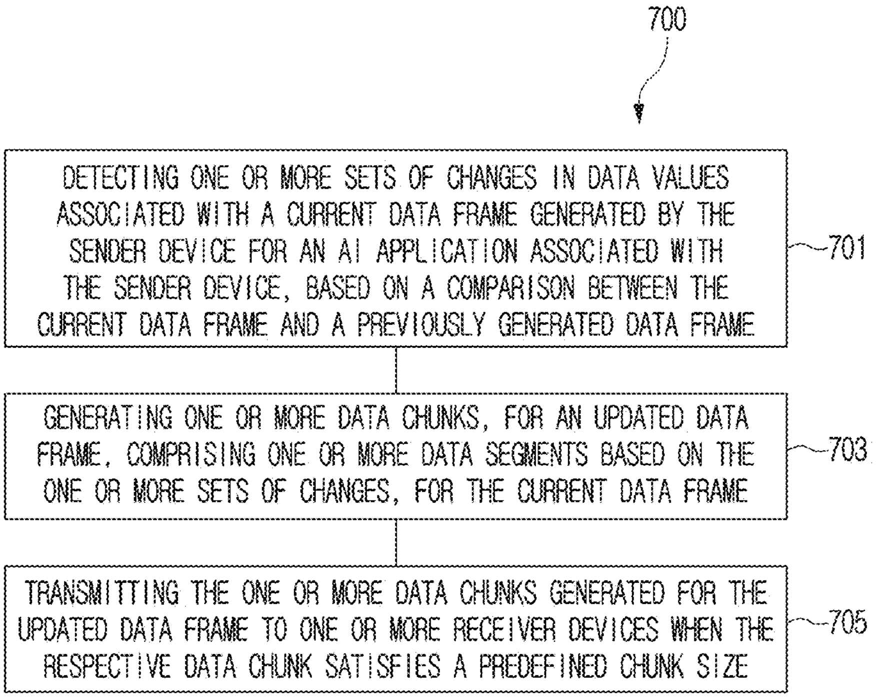
FIG. 12 is a flowchart illustrating an example method of managing communication of Artificial Intelligence (AI) data at sender device, according to various embodiments.

FIG. 12 is a flowchart illustrating an example method for managing communication of Artificial Intelligence (AI) data at a sender device in a computing environment according to various embodiments.

As illustrated in FIG. 12, the method 700 may comprise one or more steps or operations. The method 700 may be described in the general context of computer executable instructions. Generally, computer executable instructions can include routines, programs, objects, components, data structures, procedures, modules, and functions, which perform particular functions or implement particular abstract data types.

The order in which the method 700 is described is not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

At 701, the method 700 may include detecting, by the sender device 205, one or more sets of changes in data values associated with a current data frame generated by the sender device for an AI application associated with the sender device, based on a comparison between the current data frame and a previously generated data frame.

At 703, the method 700 may include generating, by the sender device 205, one or more data chunks, for an updated data frame, comprising one or more data segments based on the one or more sets of changes, for the current data frame.

At 705, the method 700 may include transmitting, by the sender device 205, the one or more data chunks generated for the updated data frame to one or more receiver devices when the respective data chunk satisfies a predefined chunk size.

Figure 13:
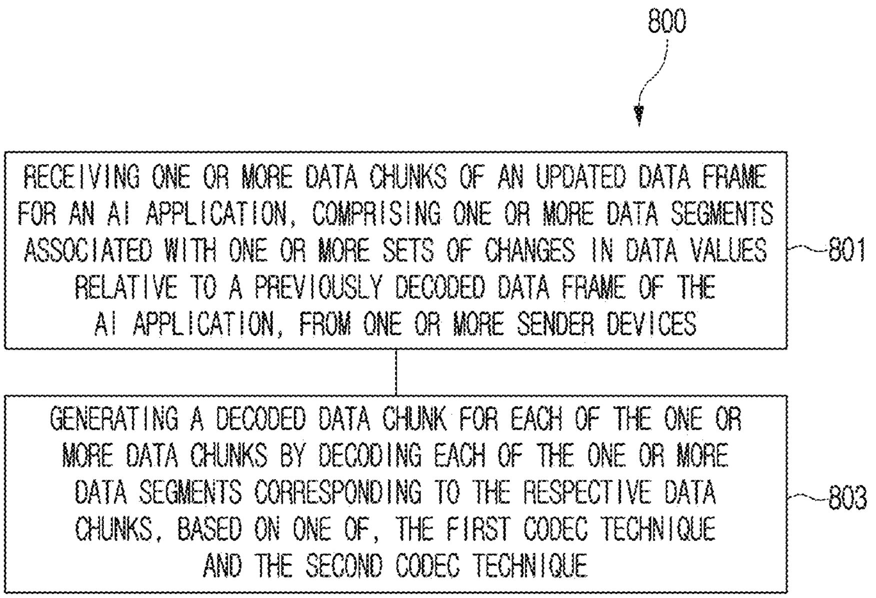
FIG. 13 is a flowchart illustrating an example method of managing communication of Artificial Intelligence (AI) data at receiver device, according to various embodiments.

FIG. 13 is a flowchart illustrating an example method for managing communication of Artificial Intelligence (AI) data at a receiver device in a computing environment according to various embodiments.

As illustrated in FIG. 13, the method 800 may comprise one or more operations. The method 700 may be described in the general context of computer executable instructions. Generally, computer executable instructions can include routines, programs, objects, components, data structures, procedures, modules, and functions, which perform particular functions or implement particular abstract data types.

The order in which the method 800 is described is not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

At 801, the method 800 may include receiving, by the receiver device 207, one or more data chunks of an updated data frame for an AI application, comprising one or more data segments associated with one or more sets of changes in data values relative to a previously decoded data frame of the AI application, from one or more sender devices.

At 803, the method 800 may include generating, by the receiver device 207, a decoded data chunk for each of the one or more data chunks by decoding each of the one or more data segments corresponding to the respective data chunks, based on one of, the first codec technique and the second codec technique.

The terms "an embodiment", "embodiment", "embodiments", "the embodiment", "the embodiments", "one or more embodiments", "some embodiments", and "one embodiment" may refer, for example, to "one or more (but not all) embodiments of the invention(s)" unless expressly specified otherwise.

The terms "including", "comprising", "having" and variations thereof may refer, for example, to "including but not limited to", unless expressly specified otherwise.

The enumerated listing of items does not imply that any or all of the items are mutually exclusive, unless expressly specified otherwise. The terms “a”, “an” and “the” may refer, for example, to “one or more”, unless expressly specified otherwise.

A description of an embodiment with several components in communication with each other does not imply that all such components are required. On the contrary, a variety of optional components are described to illustrate the wide variety of possible embodiments of the disclosure.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article, or a different number of devices/articles may be used instead of the shown number of devices or programs. The functionality and/or the features of a device may be alternatively embodied by one or more other devices which are not explicitly described as having such functionality/features. Thus, various embodiments of the disclosure need not include the device itself.

The present disclosure provides methods and devices for managing communication of Artificial Intelligence (AI) data in a computing environment. The present disclosure provides methods to reduce streaming of AI data associated with large amount of size. According to the present disclosure, the methods include performing simultaneous “encoding and transmitting” and simultaneous “receiving & decoding”. In this manner the sender may send as well as encode and the receiver may decode as well as receive, which reduces the transmission time.

The illustrated operations of FIGS. 12 and 13 show certain events occurring in a certain order. In various embodiments, certain operations may be performed in a different order, modified, or removed. Moreover, steps may be added to the above-described logic and still conform to the described embodiments. Further, operations described herein may occur sequentially or certain operations may be processed in parallel. Yet further, operations may be performed by a single processing unit or by distributed processing units.

The language used in the disclosure has been principally selected for readability and instructional purposes, and it may not have been selected to delineate or circumscribe the disclosed subject matter. It is therefore intended that the scope of the disclosure not be limited by this detailed description. Accordingly, the disclosure of the various example embodiments of the disclosure is intended to be illustrative, but not limiting, of the scope of the disclosure.

While various aspects and embodiments have been disclosed herein, other aspects and embodiments will be apparent to those skilled in the art. The various aspects and embodiments disclosed herein are for purposes of illustration and are not intended to be limiting. In other words, while the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A method of managing communication of Artificial Intelligence (AI) data between devices in a computing environment, the method comprising:

detecting, by a sender device, one or more sets of changes in data values associated with a current data frame generated by the sender device for an AI application associated with the sender device, based on a comparison between the current data frame and a previously generated data frame;

generating, by a sender device, one or more data chunks of an updated data frame, comprising one or more data segments based on the one or more sets of changes, for the current data frame, wherein the one or more data chunks are generated based on one of, a first codec technique and a second codec technique; and transmitting, by a sender device, the one or more data chunks generated for the updated data frame to one or more receiver devices based on the respective data chunk satisfying a specified chunk size.

2. The method as claimed in claim 1, wherein prior to detecting the one or more sets of changes in the data values associated with the current data frame, the method comprises selecting one of, the first codec technique and the second codec technique for the AI application.

3. The method as claimed in claim 2 further comprising:

continuously monitoring performance of the selected codec technique, based on specified performance parameters; and performing at least one of, switching the selected codec technique to another codec technique, and modifying the selected codec technique, based on the monitoring, wherein modifying the selected codec technique comprises selecting one of, a different layer of an AI model and a different type of the AI model, associated with the AI application.

4. The method as claimed in claim 1, wherein each of the one or more data segments associated with the one or more data chunks generated based on the first codec technique, comprises:

an index value indicative of:

an index corresponding to a first change in a first set of changes of the one or more sets of changes in the current data frame, for a first data segment of the one or more data segments associated with a first data chunk, and a total number of unchanged data values between two consecutive sets of changes of the one or more sets of changes in the current data frame, for the one or more data segments other than the first data segment associated with the first data chunk;

a size indicative of total number of changed data values associated with the one or more sets of changes in the current data frame, for each of the one or more data segments associated with the respective data chunk; and changed data values associated with the one or more sets of changes in the current data frame.

5. The method as claimed in claim 1, wherein each of the one or more data segments associated with the one or more data chunks generated based on the second codec technique, comprises:

an index value indicative of:

an index corresponding to a first change in a first set of changes of the one or more sets of changes in the current data frame, for a first data segment of the one or more data segments associated with a first data chunk, and a total number of unchanged data values between two consecutive sets of changes of the one or more sets of changes in the current data frame, for the one or more data segments other than the first data segment associated with the first data chunk;

changed data values associated with the one or more sets of changes in the current data frame; and a flag indicative of an end of the respective data segment.

6. The method as claimed in claim 1, wherein each set of changes of the one or more sets of changes correspond to one of, a change in consecutive data values associated with the current data frame and two or more sets of changes in the consecutive data values associated with the current data frame.

7. The method as claimed in claim 1 further comprising generating an additional data segment for each of the one or more sets of changes associated with an exceeding size determined for the respective one or more sets of changes, based on the first codec technique.

8. The method as claimed in claim 7, wherein generating the additional data segment comprises:

identifying whether a size associated with the respective one or more sets of changes in a current data frame, exceeds a specified index size;

determining the exceeding size for the respective one or more sets of changes based on the size and the specified index size, based on the size associated with the respective one or more sets of changes exceeding the specified index size; and generating the additional data segment for each of the one or more sets of changes associated with the exceeding size, wherein the additional data segment comprises the exceeding size and changed data values, corresponding to the one or more sets of changes.

9. A method of managing communication of Artificial Intelligence (AI) data between devices in a computing environment, the method comprising:

performing, by a receiver device:

receiving one or more data chunks of an updated data frame for an AI application, comprising one or more data segments associated with one or more sets of changes in data values relative to a previously decoded data frame of the AI application, from one or more sender devices, wherein each of the one or more data segments are received as encoded data segments being encoded based on one of, a first codec technique and a second codec technique; and generating a decoded data chunk for each of the one or more data chunks by decoding each of the one or more data segments corresponding to the respective data chunks, based on one of, the first codec technique and the second codec technique.

10. The method as claimed in claim 9, wherein generating the decoded data chunk for each of the one or more data chunks, based on the first codec technique comprises:

identifying an index associated with one of, changed data values, and a combination of changed data values and unchanged data values in the previously decoded data frame, based on at least an index value and a size, associated with the respective data segment;

identifying total number of unchanged data values based on the index value and the size associated with the respective data segment;

obtaining the changed data values from the respective data segment and the unchanged data values from the previously decoded data frame, wherein the changed data values are obtained for the identified index associated with the changed data values based on the size, and wherein the unchanged data values are obtained based on the identified index associated with the unchanged data values and the identified total number of unchanged data values associated with the respective data segment; and generating the decoded data chunk for each of the one or more data chunks based on the obtained changed data values and the unchanged data values.

11. The method as claimed in claim 9, wherein generating the decoded data chunk for each of the one or more data chunks, based on the second codec technique comprises:

identifying, an index associated with one of, changed data values, and a combination of changed data values and unchanged data values in the previously decoded data frame, based on at least an index value, a flag and a size indicative of total number of the changed data values, associated with the respective data segment;

identifying total number of unchanged data values based on the index value, associated with the respective data segment;

obtaining the changed data values from the respective data segment and the unchanged data values from the previously decoded data frame;

wherein the changed data values are obtained for the identified index associated with the changed data values based on the flag, and wherein the unchanged data values are obtained based on the identified index associated with the unchanged data values and the identified total number of unchanged data values associated with the respective data segment; and generating the decoded data chunk for each of the one or more data chunks based on the obtained changed data values and the unchanged data values.

12. The method as claimed in claim 11, wherein each set of change of one or more sets of changes correspond to one of, a change in consecutive data values associated with the previously decoded data frame and two or more sets of changes in the consecutive data values associated with the previously decoded data frame.

13. The method as claimed in claim 11, wherein identifying the index associated with the changed data values, for a first data segment of one or more data segments comprises obtaining the index based on the index value associated with the first data segment.

14. The method as claimed in claim 11, wherein identifying the index associated with the changed data values and the unchanged data values for one or more data segments other than a first data segment, comprises adding the size associated with the respective data segment, with a last index value of the changed data values associated with a previous data segment.

15. A sender device configured to mange communication of Artificial Intelligence (AI) data between devices in a computing environment, comprising:

at least one processor comprising processing circuitry; and a memory communicatively coupled to the at least one processor, wherein the memory stores processor instructions, wherein the at least one processor, individually and/or collectively, is configured to:

detect one or more sets of changes in data values associated with a current data frame generated by the sender device for an AI application associated with the sender device, based on a comparison between the current data frame and a previously generated data frame; and perform:

generating one or more data chunks of an updated data frame, comprising one or more data segments based on the one or more sets of changes, for the current data frame, wherein the one or more data chunks are generated based on one of, a first codec technique and a second codec technique; and transmitting the one or more data chunks generated for the updated data frame to one or more receiver devices when the respective data chunk satisfies a predefined chunk size.

16. The sender device as claimed in claim 15, wherein prior to detecting the one or more sets of changes in the data values associated with the current data frame, the at least one processor is configured to select one of, the first codec technique and the second codec technique for the AI application.

17. The sender device as claimed in claim 15, wherein the at least one processor is further configured to:

continuously monitor performance of the selected codec technique, based on specified performance parameters; and perform at least one of, switching the selected codec technique to another codec technique, and modifying the selected codec technique, based on the monitoring, wherein modifying the selected codec technique comprises selecting one of, a different layer of an AI model and a different type of the AI model, associated with the AI application.

18. The sender device as claimed in claim 15, wherein each of the one or more data segments associated with the one or more data chunks generated based on the first codec technique, comprises:

an index value indicative of:

an index corresponding to a first change in a first set of changes of the one or more sets of changes in the current data frame, for a first data segment of the one or more data segments associated with a first data chunk, and a total number of unchanged data values between two consecutive sets of changes of the one or more sets of changes in the current data frame, for the one or more data segments other than the first data segment associated with the first data chunk;

a size indicative of total number of changed data values associated with the one or more sets of changes in the current data frame, for each of the one or more data segments associated with the respective data chunk; and changed data values associated with the one or more sets of changes in the current data frame.

19. The sender device as claimed in claim 15, wherein each of the one or more data segments associated with the one or more data chunks generated based on the second codec technique, comprises:

an index value indicative of:

an index corresponding to a first change in a first set of changes of the one or more sets of changes in the current data frame, for a first data segment of the one or more data segments associated with a first data chunk, and a total number of unchanged data values between two consecutive sets of changes of the one or more sets of changes in the current data frame, for the one or more data segments other than the first data segment associated with the first data chunk;

changed data values associated with the one or more sets of changes in the current data frame; and a flag indicative of an end of the respective data segment.

20. The sender device as claimed in claim 15, wherein each set of changes of the one or more sets of changes correspond to one of, a change in consecutive data values associated with the current data frame and two or more sets of changes in the consecutive data values associated with the current data frame.

* * * * *